United States Patent
Aronovich

(10) Patent No.: US 10,031,937 B2
(45) Date of Patent: Jul. 24, 2018

(54) SIMILARITY BASED DATA DEDUPLICATION OF INITIAL SNAPSHOTS OF DATA SETS

(71) Applicant: INTERNATIONAL BUSINESS MACHINES CORPORATION, Armonk, NY (US)

(72) Inventor: Lior Aronovich, Thornhill (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 88 days.

(21) Appl. No.: 14/952,307

(22) Filed: Nov. 25, 2015

(65) Prior Publication Data
US 2017/0147648 A1    May 25, 2017

(51) Int. Cl.
| G06F 17/00 | (2006.01) |
| G06F 7/00 | (2006.01) |
| G06F 17/30 | (2006.01) |
| G06F 3/06 | (2006.01) |

(52) U.S. Cl.
CPC ...... *G06F 17/30371* (2013.01); *G06F 3/0641* (2013.01); *G06F 17/30088* (2013.01); *G06F 17/30159* (2013.01)

(58) Field of Classification Search
CPC ......... G06F 17/30088; G06F 17/30097; G06F 17/30156; G06F 17/30159; G06F 3/0641; G06F 17/30109
See application file for complete search history.

(56) References Cited

U.S. PATENT DOCUMENTS

| 8,204,862 B1 * | 6/2012 | Paulzagade ......... G06F 11/1469 707/679 |
| 8,306,948 B2 | 11/2012 | Chou et al. |
| 8,321,648 B2 | 11/2012 | Condict |
| 8,402,250 B1 * | 3/2013 | Juillard ............ G06F 17/30159 711/154 |
| 8,745,003 B1 | 6/2014 | Patterson |
| 8,825,971 B1 | 9/2014 | Auchmoody et al. |
| 8,935,487 B2 | 1/2015 | Sengupta et al. |
| 9,110,936 B2 | 8/2015 | Li et al. |
| 2011/0145207 A1 | 6/2011 | Agrawal et al. |

(Continued)

FOREIGN PATENT DOCUMENTS

CN    103118104 A    5/2013

OTHER PUBLICATIONS

Bhagwat et al., "Extreme Binning: Scalable, Parallel Deduplication for Chunk-based File Backup", 9 pages, Proceedings of the 17th IEEE/ACM International Symposium on Modeling, Analysis and Simulation of Computer and Telecommunications Systems (MAS-COTS'2009), Sep. 2009.

(Continued)

*Primary Examiner* — Marc S Somers
(74) *Attorney, Agent, or Firm* — Griffiths & Seaton PLLC

(57) ABSTRACT

Embodiments for data deduplication of an initial snapshot of a data set in a storage system by a processor. An intra-snapshot similarity index, inclusive of representations of the data inside the initial snapshot, is built. The intra-snapshot similarity index is used for deduplication of the initial snapshot. The intra-snapshot similarity index is merged with a global similarity index.

24 Claims, 18 Drawing Sheets

(56) References Cited

U.S. PATENT DOCUMENTS

| | | | |
|---|---|---|---|
| 2011/0161299 A1* | 6/2011 | Prahlad | G06F 17/30091 |
| | | | 707/649 |
| 2011/0258404 A1 | 10/2011 | Arakawa et al. | |
| 2012/0166448 A1* | 6/2012 | Li | G06F 17/30097 |
| | | | 707/747 |
| 2012/0323859 A1* | 12/2012 | Yasa | G06F 17/30156 |
| | | | 707/692 |
| 2014/0279951 A1* | 9/2014 | Akirav | G06F 17/30156 |
| | | | 707/692 |
| 2015/0019816 A1 | 1/2015 | Akirav et al. | |

OTHER PUBLICATIONS

Wei Zhang et al., "Multi-level Selective Deduplication for VM Snapshots in Cloud Storage", 5 pages, IEEE 5th International Conference, Jun. 2012.

Moses S. Charikar, "Similarity Estimation Techniques from Rounding Algorithms", 9 pages, ACM Symposium on Theory of Computing, 2002.

Wei Zhang et al., "VM-Centric Snapshot Deduplication for Cloud Data Backup", 12 pages, IEEE 2015.

* cited by examiner

1100

Case A

Case B

Case C

SIMILARITY BASED DATA DEDUPLICATION OF INITIAL SNAPSHOTS OF DATA SETS

BACKGROUND OF THE INVENTION

Field of the Invention

The present invention relates in general to computers, and more particularly to similarity based data deduplication of initial snapshots of data sets in a computing environment.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. An efficient way to alleviate the problem is by using deduplication. The idea underlying a deduplication system is to exploit the fact that large parts of the available data are copied again and again, by locating repeated data and storing only its first occurrence. Subsequent copies are replaced with pointers to the stored occurrence, which significantly reduces the storage requirements if the data is indeed repetitive.

SUMMARY OF THE DESCRIBED EMBODIMENTS

Embodiments for data deduplication of an initial snapshot of a data set in a storage system by a processor are provided. In one embodiment, by way of example only, an intra-snapshot similarity index, inclusive of representations of the data inside the initial snapshot, is built. The intra-snapshot similarity index is used for deduplication of the initial snapshot. The intra-snapshot similarity index is merged with a global similarity index.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Data deduplication is a highly important and vibrant field in computing storage systems. Data deduplication refers to the reduction and/or elimination of redundant data. In data deduplication, a data object, which may be a file, a data stream, or some other form of data, is partitioned into one or more parts called chunks or blocks. In a data deduplication process, duplicate copies of data are reduced or eliminated, leaving a minimal amount of redundant copies, or a single copy of the data, respectively. The goal of a data deduplication system is to store a single copy of duplicated data, and the challenges in achieving this goal are efficiently finding the duplicate data patterns in a typically large repository, and storing the data patterns in a storage efficient deduplicated form.

A snapshot of data in a data storage system is a copy of the data frozen at a specific point in time. Snapshots are used to obtain consistent copies of data sets for various use cases, such as backup, archiving, data analysis, development and testing, while allowing applications to continue writing and modifying data. Snapshot implementations typically create snapshots in a time that is not dependent on the size of the data set, and allow applications to write data concurrently with the creation of a snapshot. Typically, after creation of an initial snapshot, the storage system tracks storage blocks that are changed between creation of consecutive snapshots. For a new further snapshot, the storage system will store the storage blocks that have changed since the last snapshot, along with references to unchanged data.

The size of the blocks tracked for changes is usually relatively large, because tracking small blocks in large data repositories requires much resources and is often prohibitive. Typical sizes of tracked storage blocks can range between 64 KB and 256 KB. However, the changes actually applied to the data can be in a granularity that is smaller than the size of the tracked storage blocks, especially if the snapshots are created frequently. The result is that the size of the data being stored for a snapshot can be considerably larger than the size of the data that was actually changed since the last snapshot.

Figure 1:
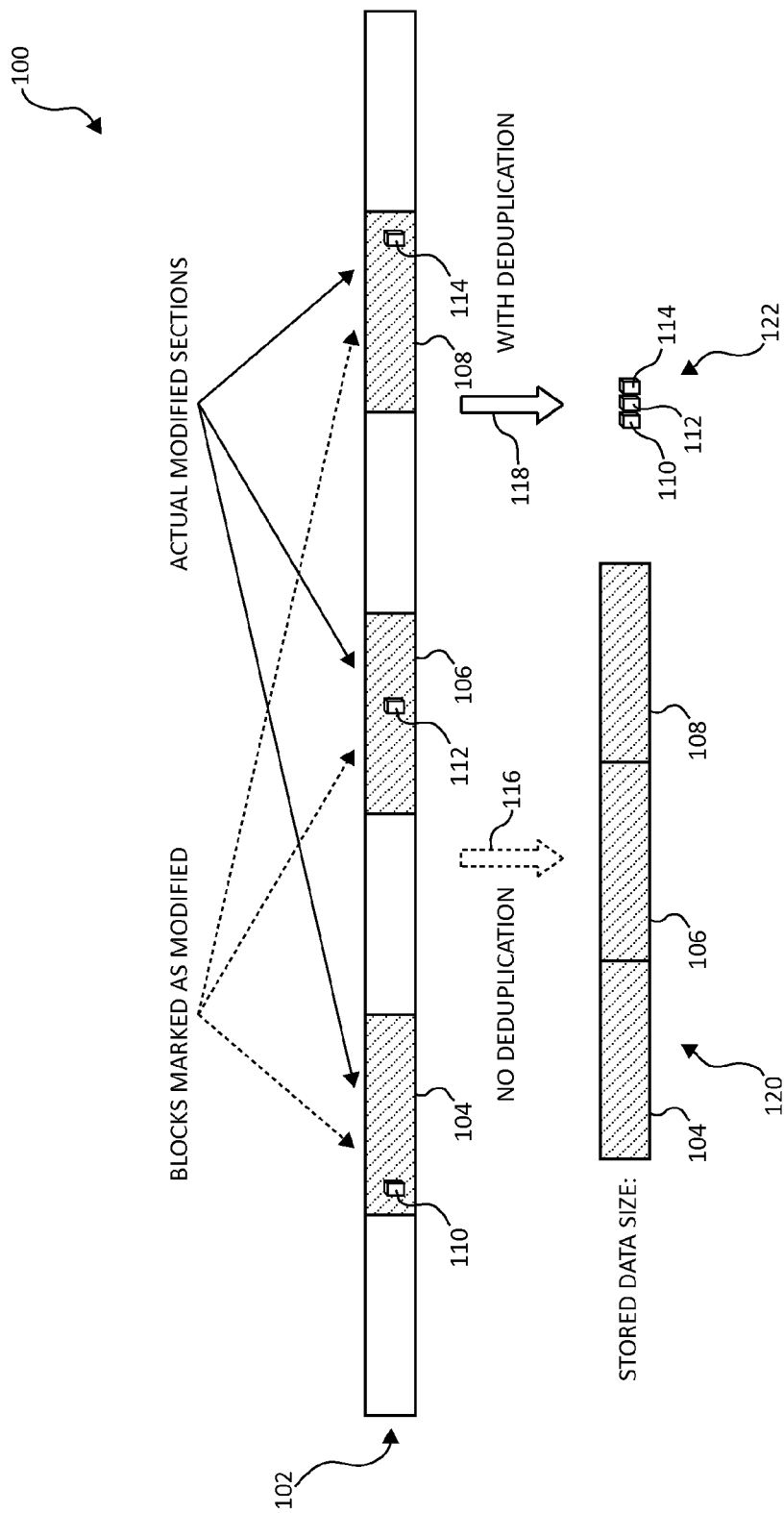
FIG. 1 is a block diagram of an illustration of storage of snapshots without data deduplication functionality versus storage of snapshots with data deduplication functionality.

Adding data deduplication to the creation and storage processes of snapshots enables to store only the data that was actually changed, rather than the full sized blocks tracked for changes, thus considerably reducing storage consumption of the snapshots. FIG. 1 illustrates this storage efficiency benefit by showing the marked difference in stored data sizes, in which the entire contents of the blocks marked as modified are stored when not using data deduplication, and in which only the actual modified sections inside the blocks marked as modified are stored when using data deduplication, as shown in illustration 100.

A series of blocks 102 are shown in sequence. Several blocks 104, 106, and 108 are marked as modified, while the actual modified sections 110, 112, and 114 are physically markedly smaller than the physical size of the entire blocks marked as modified 104, 106, and 108 and shown. The blocks 104, 106, and 108 are stored as-is as shown in 120 when no deduplication (arrow 116) is performed, and their stored data size equals to their full size 120. Conversely, the stored data size 122 is markedly reduced by use of deduplication (arrow 118), as only the actual modified sections 110, 112, and 114 are stored as shown.

Since data deduplication can reduce the storage consumption and costs for storing snapshots, a storage system with data deduplication may be able to store a large number of snapshots, compared to a smaller capacity without data deduplication. There are many applications that require copies of data sets, for example: backup, disaster recovery, instant restore, archive, development, testing, and data analysis. Deduplicated snapshots can enable to provide many of these functionalities directly from a deep store of deduplicated snapshots, rather than having different technologies store their own data copies separately. This enables to reduce costs, consolidate resources, simplify management, and increase infrastructure utilization.

To be effective, data deduplication of snapshots should work with a small granularity. Namely, the size of the deduplication blocks should be typically a few kilobytes. However, in large data repositories the number of deduplication blocks of such size can be very large, and storing deduplication representations for a large number of blocks is often prohibitive. For example, in a data repository of 1 Petabytes, the number of deduplication blocks of 2 Kilobyes is 512 Giga blocks, and multiplying this by a hash size of 20 bytes (the size of SHA-1), this totals to 10 Terabytes—required only for the deduplication meta-data.

A new approach is therefore required for data deduplication of snapshots, to enable small granularity deduplication while keeping the meta-data size for deduplication low and supporting high efficiency of the deduplication process.

The mechanisms of the illustrated embodiments, following, introduce various aspects of functionality for performing similarity based data deduplication for snapshots of data, among other aspects, that address the need for small granularity deduplication and other needs discussed previously.

Similarity based data deduplication, among other benefits, enables the achievement of efficient data deduplication using small data blocks, by partitioning the search for data matches to two steps. In a first step, similar data is searched in a repository. The granularity for this step is large data blocks, e.g. 8 MB. In a second step, matches of identical data are determined in the similar input and repository data. The granularity for this step is smaller data blocks, e.g. 2 KB. Depending on the matching algorithm that is used, a single byte granularity is also supported.

The similarity based data deduplication approach is scalable and efficient because the search index used in the similarity step is compact and simple to maintain and search within. The search index is compact because, among other benefits, the representation elements used for the similarity search are very compact relative to the data they represent, e.g. 16 bytes representing 4 megabytes. Typically, in one embodiment, the similarity index can fit in memory. Once similar data is found, digests of the similar data or the similar data itself are loaded into memory, to perform an efficient data matching process that uses hash lookup. This second step process is also efficient in both memory and processing time. Overall, the similarity based data deduplication approach provides scalability to very large data repositories, as well as high efficiency and performance.

While similarity based approaches provide abundant benefits, the similarity based deduplication algorithms provided thus far are designed for a data backup environment, where large streams of backup data are being processed, and each such stream can be partitioned into large chunks of data, e.g. 8 MB, for which similar data can be searched. However, in a data snapshots environment, a data deduplication mechanism is required to deduplicate the tracked storage blocks. These blocks are typically smaller than the similarity blocks used in the existing similarity methods, e.g. 64 KB tracked storage block size versus 8 MB similarity block size. In addition, the tracked storage blocks to be deduplicated are typically independent of each other, and can come from arbitrary locations in the data repository.

In order to deduplicate each of the tracked storage blocks, the resolution of the similarity index should be considerably increased relative to the resolution in the backup environment. In the aforementioned example the resolution increase is ×128. In addition, the number of IO operations per second for maintaining and searching in the similarity index also increases accordingly, and this further grows as the frequency of the snapshots increases. In typical settings of snapshot environments, the required IO operations per second can reach several thousands of operations. These high requirements of size and IO operations per second entailed by the existing similarity based deduplication algorithms can result in storage operation inefficiencies in snapshots environments.

Accordingly, new methodologies are beneficial for providing an efficient, scalable, and effective data deduplication solution for snapshots data. In general, deduplication of snapshots data is an emerging field with a wide applicability scope.

The mechanisms of the illustrated embodiments, in view of the foregoing, introduce various data deduplication functionality that is specifically designed and optimized for snapshots data. These mechanisms aim to provide an efficient, scalable and effective solution for deduplicating snapshots data, with a wide applicability scope for a broad range of storage systems that include snapshots capabilities.

Figure 2:
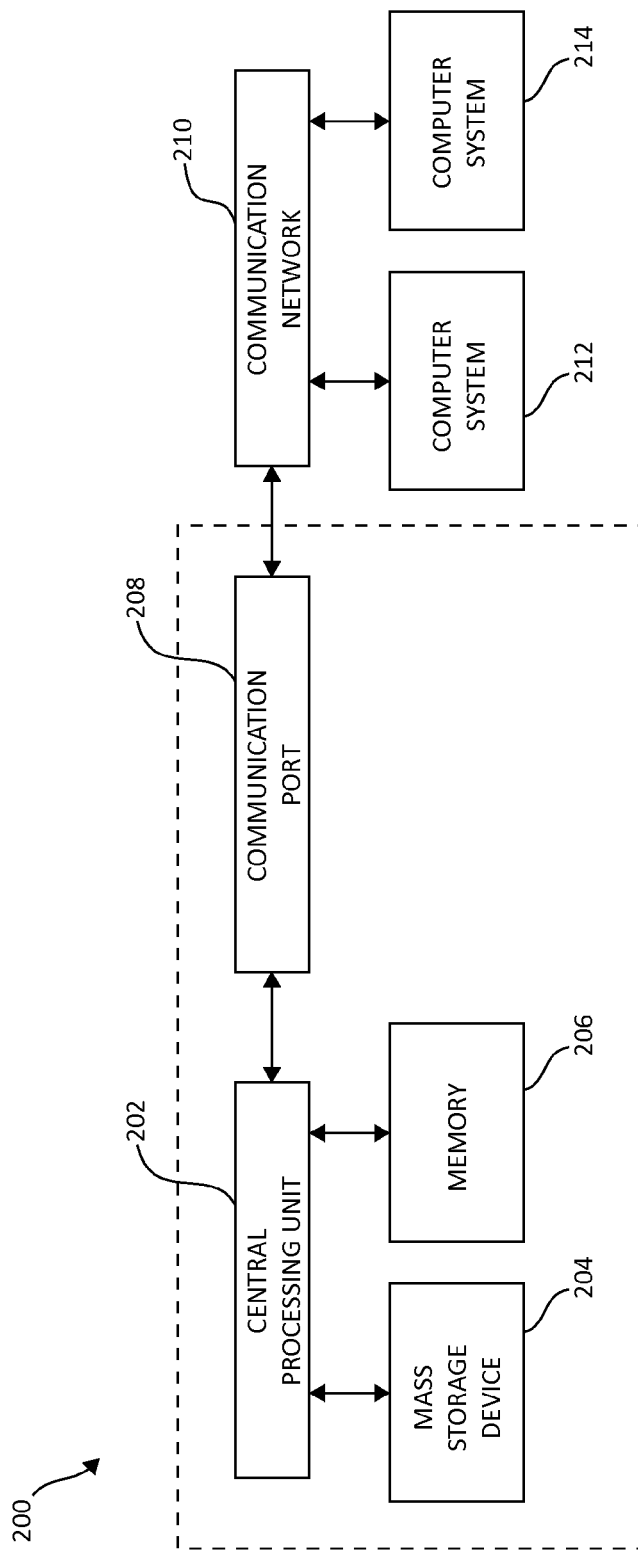
FIG. 2 is a block diagram illustrating a computing system environment having an example storage device in which aspects of the present invention may be realized.

Returning now to the Figures, and to FIG. 2, specifically, exemplary architecture 200 of a computing system environment is depicted. Architecture 200 may, in one embodiment, be implemented at least as part of a system for effecting mechanisms of the present invention. The computer system embodied in architecture 200 includes at least one central processing unit (CPU) 202, which is connected to communication port 208 and memory device 206. The communication port 208 is in communication with a communication network 210. The communication network 210 may be configured to be in communication with systems 212, 214 and architecture 200, which may include storage devices 204. The storage systems may include hard disk drive (HDD) devices, solid-state devices (SSD) etc., which may be configured in a redundant array of independent disks (RAID).

The operations as described below may be executed on storage device(s) 204, located in system 200 or elsewhere, and may have multiple memory devices 206 working independently and/or in conjunction with other CPU devices 12. Memory device 206 may include such memory as electrically erasable programmable read only memory (EEPROM) or a host of related devices. Memory device 206 and storage devices 204 are connected to CPU 202 via a signal-bearing medium. In addition, memory device 206 and the CPU 202 may be embedded and included in each component of the computing system 200. Each storage system may also include separate and/or distinct memory devices 206 and CPU 202 that work in conjunction or as a separate memory device 206 and/or CPU 202. As one of ordinary skill in the art will appreciate, a number of systems 200 may be configured in a connected and/or distributed way, physically located together or across a long geographically connected network, for example.

Figure 3:
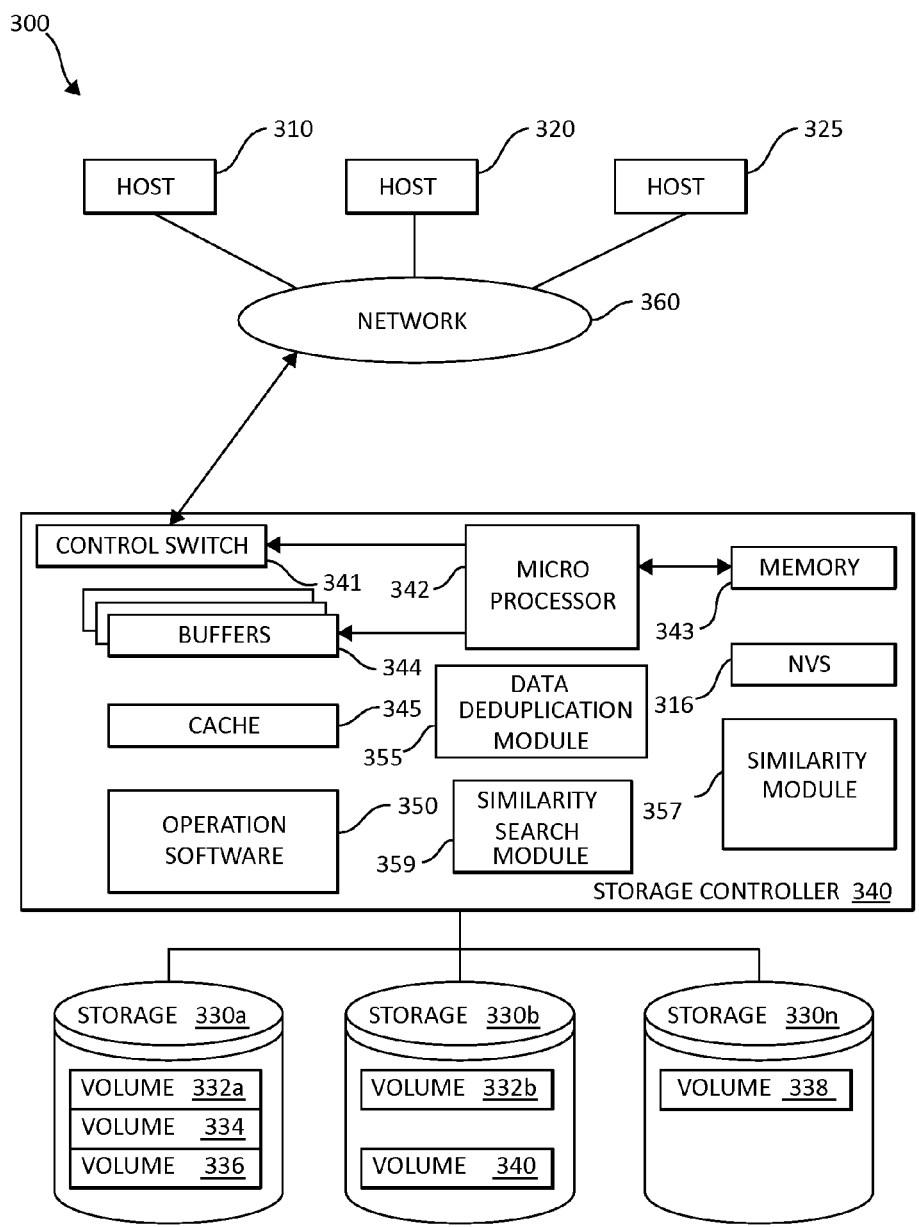
FIG. 3 is a block diagram illustrating a hardware structure of data storage system in which aspects of the present invention may be realized.

Turning now to FIG. 3, following; FIG. 3 is an exemplary block diagram showing a hardware structure of a data storage system 300 that may be used in the overall context of performing functionality according to various aspects of the present invention. Data storage system 300 may for example, in one embodiment, implement a snapshot-based deduplication system as will be further described.

Host computers 310, 320, and 325, are shown, each acting as a central processing unit for performing data processing as part of a data storage system 300. The cluster hosts/nodes (physical or virtual devices), 310, 320, and 325 may be one or more new physical devices or logical devices to accomplish the purposes of the present invention in the data storage system 300. Data storage system 300 may implement additional functionality; and one of ordinary skill in the art will recognize that a variety of deduplication, encryption, data processing, etc. hardware and software, separately or in combination, may be utilized to implement the functionality according to aspects of the illustrated embodiments.

Network connection 360 may be a fibre channel (FC) fabric, a fibre channel point-to-point link, a fibre channel over Ethernet (FCoE) fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 310, 320, and 325 may be local or distributed among one or more locations and may be equipped with any type of fabric (or fabric channel) (not shown in FIG. 3) or network adapter 360 to the storage controller 240, such as Fibre channel, FICON, ESCON, Ethernet, fiber optic, wireless, or coaxial adapters. Data storage system 300 is accordingly equipped with a suitable fabric (not shown in FIG. 3) or network adaptor 360 to communicate. Data storage system 300 is depicted in FIG. 3 comprising storage controllers 340 and cluster hosts 310, 320, and 325. The cluster hosts 310, 320, and 325 may include cluster nodes found in a distributed computing environment.

To facilitate a clearer understanding of the methods described herein, storage controller 340 is shown in FIG. 3 as a single processing unit, including a microprocessor 342, system memory 343 and nonvolatile storage ("NVS") 316. It is noted that in some embodiments, storage controller 340 is comprised of multiple processing units, each with their own processor complex and system memory, and interconnected by a dedicated network within data storage system 300. Storage 330 (labeled as 330a, 330b, and 330n herein) may be comprised of one or more storage devices, such as storage arrays, which are connected to storage controller 340 (by a storage network) with one or more cluster hosts 310, 320, and 325 connected to each storage controller 340 through network 360.

In some embodiments, the devices included in storage 330 may be connected in a loop architecture. Storage controller 340 manages storage 330 and facilitates the processing of write and read requests intended for storage 330. The system memory 343 of storage controller 340 stores program instructions and data, which the processor 342 may access for executing functions and method steps of the present invention for executing and managing storage 330 as described herein. In one embodiment, system memory 343 includes, is in association with, or is in communication with the operation software 350 for performing methods and operations described herein. As shown in FIG. 3, system memory 343 may also include or be in communication with a cache 345 for storage 330, also referred to herein as a "cache memory," for buffering "write data" and "read data," which respectively refer to write/read requests and their associated data. In one embodiment, cache 345 is allocated in a device external to system memory 343, yet remains accessible by microprocessor 342 and may serve to provide additional security against data loss, in addition to carrying out the operations as described herein.

In some embodiments, cache 345 is implemented with a volatile memory and nonvolatile memory and coupled to microprocessor 342 via a local bus (not shown in FIG. 3) for enhanced performance of data storage system 300. The NVS 316 included in data storage controller is accessible by microprocessor 342 and serves to provide additional support for operations and execution of the present invention as described in other figures. The NVS 316, may also be referred to as a "persistent" cache, or "cache memory" and is implemented with nonvolatile memory that may or may not utilize external power to retain data stored therein. The NVS may be stored in and with the cache 345 for any purposes suited to accomplish the objectives of the present invention. In some embodiments, a backup power source (not shown in FIG. 3), such as a battery, supplies NVS 316 with sufficient power to retain the data stored therein in case of power loss to data storage system 300. In certain embodiments, the capacity of NVS 216 is less than or equal to the total capacity of cache 345.

Storage 330 may be physically comprised of one or more storage devices, such as storage arrays. A storage array is a logical grouping of individual storage devices, such as a hard disk. In certain embodiments, storage 330 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 3 may include a logical volume, or simply "volume," may have different kinds of allocations. Storage 330a, 330b and 330n are shown as ranks in data storage system 300, and are referred to herein as rank 330a, 330b and 330n. Ranks may be local to data storage system 300, or may be located at a physically remote location. In other words, a local storage controller may connect with a remote storage controller and manage storage at the remote location. Rank 330a is shown configured with two entire volumes, 334 and 336, as well as one partial volume 332a. Rank 330b is shown with another partial volume 332b. Thus volume 332 is allocated across ranks 330a and 330b. Rank 330n is shown as being fully allocated to volume 338—that is, rank 330n refers to the entire physical storage for volume 338. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 340 may include a data deduplication module 355, a similarity module 357, and a similarity search module 359, as well as a number of repositories (not shown). The data deduplication module 355, similarity module 357, similarity search module 359, and repositories may operate in conjunction with each and every component of the storage controller 340, the hosts 310, 320, 325, and storage devices 330. The data deduplication module 355, similarity module 357, similarity search module 359, and repositories may be structurally one complete module or may be associated and/or included with other individual modules or other structures. The data deduplication module 355, similarity module 357, similarity search module 359, and repositories may also be located in the cache 345 or other components, as one of ordinary skill in the art will appreciate.

The data deduplication module 355, similarity module 357, similarity search module 359, and repositories may individually and/or collectively perform various aspects of the present invention as will be further described. For example, the data deduplication module 355 may perform various data deduplication functionality in accordance with aspects of the illustrated embodiments.

The similarity module 357 may perform a variety of functionality as will be further described, such as partitioning input snapshot data into changed tracked blocks, grouping the changed tracked blocks into enclosing similarity units, and partitioning the changed tracked blocks into variable-sized deduplication blocks. The similarity search module 359 may also perform a variety of functionality as will be further described, such as examining deduplication coverage and conducting similarity searches between input similarity units and corresponding similarity units of a previous snapshot. As one of ordinary skill in the art will appreciate, the data deduplication module 355, similarity module 357, similarity search module 359, and repositories may make up only a subset of various functional and/or functionally responsible entities in the data storage system 300.

Other ancillary hardware may be associated with the storage system 300. For example, as shown, the storage controller 340 includes a control switch 341 for controlling the fiber channel protocol to the host computers 310, 320, 325, a microprocessor 342 for controlling all the storage controller 340, a nonvolatile control memory 343 for storing a microprogram (operation software) 350 for controlling the operation of storage controller 340, data for control, cache 345 for temporarily storing (buffering) data, and buffers 244 for assisting the cache 245 to read and write data, a control switch 341 for controlling a protocol to control data transfer to or from the storage devices 330, the data deduplication module 355, similarity module 357, similarity search module 359, and repositories, or other blocks of functionality, in which information may be set. Multiple buffers 344 may be implemented with the present invention to assist with the operations as described herein.

In one embodiment of the present invention, the input changed tracked blocks (i.e., tracked blocks that were determined as changed by the snapshot mechanism) are grouped by the mechanisms of the illustrated embodiments by enclosing larger "similarity units," and are then processed for deduplication according to these similarity unit groups.

Figure 4:
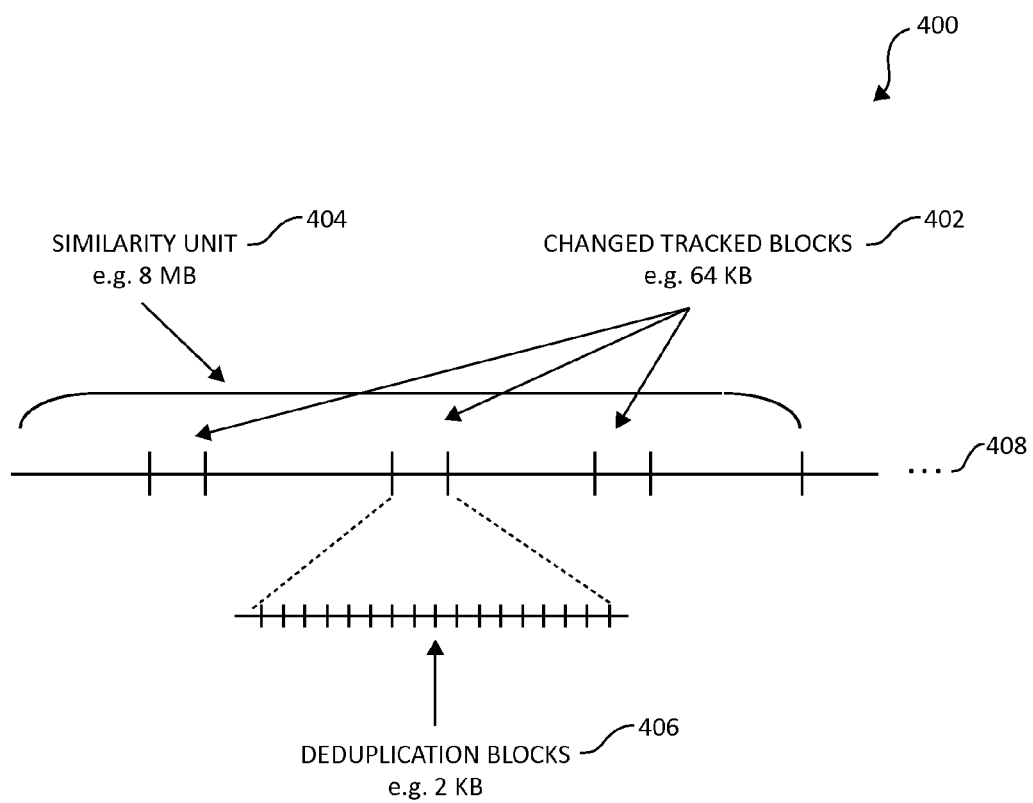
FIG. 4 is an illustration of exemplary tracked blocks enclosed by similarity units, in which aspects of the present invention may be realized.

Turning to FIG. 4, following, an illustration 400 of this functionality is shown, with a group of input changed tracked blocks 402 that are shown as part of a larger sequence of blocks 408. The changed tracked blocks 402 are organized by an enclosing similarity unit 404 and processed for deduplication as shown. The changed tracked blocks 402 have an exemplary size of 64 KB, and are enclosed by a similarity unit 404 having an exemplary size of 8 MB. Each one of the changed tracked blocks is processed into a number of deduplication blocks 406 having an exemplary size of 2 KB.

In one embodiment, the boundaries of the similarity units 404 are aligned to the size of the tracked blocks 402, namely a tracked block can not span over similarity units. The start positions of the similarity units are aligned to their size. For example: Assuming that the size of a similarity unit is 8 MB and the size of a tracked block is 64 KB, then the start positions of the similarity units are 0, 8 MB, 16 MB, 24 MB, etc. Consider for example 4 tracked blocks, starting at positions 896 KB, 5120 KB, 21824 KB, and 27840 KB. The first two tracked blocks will be grouped within the similarity unit starting at position 0. The third tracked block will be grouped within the similarity unit starting at position 16 MB. The fourth tracked block will be grouped within the similarity unit starting at position 24 MB.

Only similarity units that contain at least one input changed tracked block are processed for deduplication. The input tracked blocks in a group are processed together for deduplication as shown. Further, and as shown, each input changed tracked block 402 is further partitioned into variable sized deduplication blocks, e.g. of mean size 2 KB. The set of deduplication blocks starts at position 0 of each changed tracked block, and deduplication blocks do not span over tracked blocks.

The model depicted in FIG. 4 enables to achieve high resolution deduplication for snapshots while keeping the similarity index compact, and performing similarity search with a lower resolution than that of the tracked blocks, which considerably reduces the Input/Output (IO) operations per second.

An observation underlying another aspect of the illustrative embodiments is that using prior knowledge for attempting to perform efficient deduplication of a group of input changed tracked blocks is more efficient, and only if this attempt does not produce sufficient deduplication a global similarity search is performed for the input group of blocks. The mechanisms of the illustrated embodiments first identify a similarity unit in the previous snapshot (if exists) that corresponds to the input similarity unit, and attempt deduplication with this corresponding similarity unit.

Figure 5:
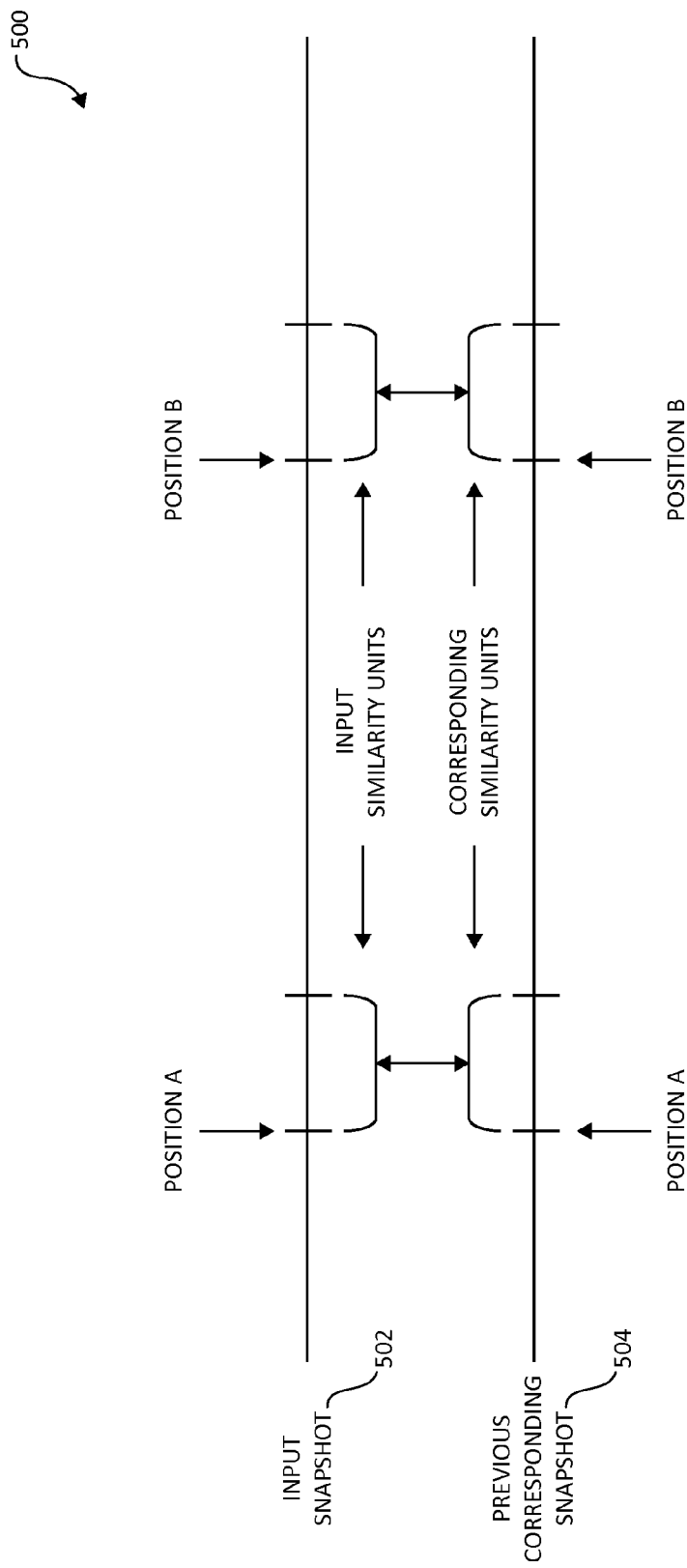
FIG. 5 is an illustration of exemplary pairs of corresponding similarity units in an input snapshot and a previous snapshot of a data set, here again in which aspects of the present invention may be realized.

A corresponding similarity unit in a previous snapshot is defined as having a beginning position in the previous snapshot, which is identical to the beginning position of the input similarity unit in the input snapshot. FIG. 5, following, in illustration 500, shows pairs of corresponding similarity units in an input snapshot (e.g., input snapshot 502) and a previous snapshot (e.g., previous corresponding snapshot 504) of a data set.

Referring to illustration 500, in one embodiment, the mechanisms of the present invention load the deduplication digests of the corresponding similarity unit of the previous snapshot into memory, and apply a digests matching process to the digests of the input and the corresponding similarity units. The mechanisms then check the coverage of deduplication. If coverage is sufficient, (e.g., above or equal to a threshold), then the calculated matches are used and processing proceeds to the next input similarity unit. If coverage is insufficient, (e.g., below a threshold), then the mechanisms apply a similarity search for the input similarity unit, by searching for a similar data unit in a similarity index, and if found the mechanisms load the deduplication digests of the found similarity unit into memory, apply a digests matching process to the digests of the input and the found similarity units, and combine the matches found in the current and the previous matching processes to a unified set of matches.

With the above model, the following challenge becomes apparent: For each input similarity unit a representative value has to be calculated to enable searching for similar data in a similarity index and to enable storing the information of the input similarity unit in the similarity index. To be effective, a representative value has to be calculated based on the full data of a similarity unit. However, in the above model only the data of the changed tracked blocks is provided in the input, and reading the unchanged data is inefficient and adds considerable overhead.

To address the challenge previously described, the mechanisms of the illustrated embodiments introduce an additional aspect, which is a novel methodology for calculating representative values for input similarity units in snapshots data. In the mechanisms of the illustrated embodiments, for an input similarity unit, the digests of a corresponding similarity unit in a previous snapshot of the data set (i.e. the corresponding similarity unit has a position in the previous snapshot which is the same as the position of the input similarity unit in the input snapshot), are loaded in memory for applying deduplication with the input similarity unit. Subsequently, the mechanisms combine the digests of the unchanged tracked blocks sourced from the digests of the corresponding similarity unit (which are loaded in memory) with the input digests of the changed tracked blocks of the input similarity unit, to produce a representative value for the input similarity unit.

Figure 6:
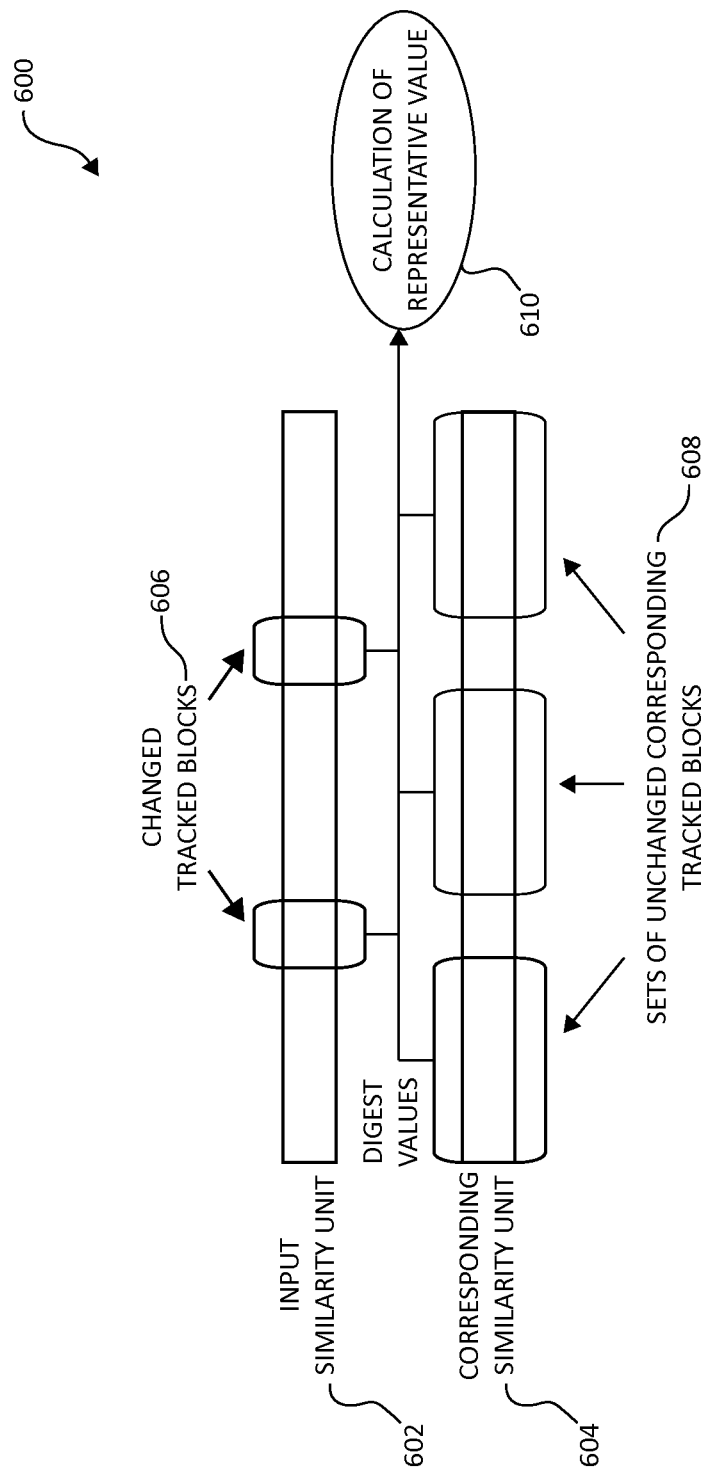
FIG. 6 is a block diagram of illustrative exemplary functionality for calculating a representative value based on the digests of the changed tracked blocks of the input similarity unit and the digests of the unchanged tracked blocks of the corresponding similarity unit, again in which aspects of the present invention may be implemented.

The calculation of a representative value for an input similarity unit based on the digests of the changed tracked blocks of the input similarity unit and the digests of the unchanged tracked blocks of the corresponding similarity unit is depicted in an exemplary embodiment as illustration 600 in FIG. 6, following. An input similarity unit 602 and a corresponding similarity unit 604 are shown. For the input similarity unit 602, the digest values of the changed tracked blocks 606 are included in the calculation of the representative value 610 for the input similarity unit 602. In addition, the digest values of the unchanged tracked blocks 608 sourced from the digest values of the corresponding similarity unit 604 are also included in the calculation of the representative value 610 for the input similarity unit 602. The digest values of the input changed tracked blocks 606 and the digest values of the unchanged corresponding tracked blocks 608 are combined in a calculation of the representative value 610 for the input similarity unit 602 as shown. This representative value is thus calculated based on the entire data of the input similarity unit 602. Since the digests required for this calculation are loaded into memory for the deduplication process itself, there is no overhead for this calculation.

An additional aspect of the illustrated embodiments is a novel methodology for combining data matches calculated in multiple deduplication processes for an input similarity unit, to provide an efficient set of data matches covering the input data. This methodology is required to combine the data matches generated by deduplication with a corresponding similarity unit, and the data matches generated by deduplication with a similarity unit found using the similarity index. The methodology is generic for combining data matches generated by various deduplication processes performed on different repository parts.

In view of the preceding, in one embodiment, the data matches are sorted by their start positions, and subsequently, data matches that are fully enclosed within other data matches or are too small for citing are eliminated. Next, each pair of data matches with an overlap section is scanned in ascending order, and from each pair a data match is selected to be retained in its full size. One example of a selection criterion is to select the data match whose size is maximal. Next, the other data match in the pair is truncated, by removing the overlap section from the other data match. Then the truncated data match is retained if it is not fully enclosed within the next data match in the sorted list of data matches and if it is not too small for citing. Otherwise, the truncated data match is removed. Then, the next pair of data matches with an overlap section is process by the methodology.

An additional aspect of the mechanisms of the illustrated embodiments concerns a methodology for efficient deduplication of an initial snapshot in a chain of snapshots, namely a snapshot that does not have a preceding snapshot of the same data set. The problem addressed is that for an initial snapshot there is no previous snapshot to provide an efficient alternative for finding similar data. Accessing the global similarity index for each of the similarity units of the initial snapshot can consume much resources. Moreover, initial snapshots contain the full data of their data sets, and therefore can be large, i.e., consisting of a large number of tracked blocks and similarity units. The objective of the proposed methodology is to reduce accesses to the global similarity index.

In the mechanisms of the illustrated embodiments, a separate, in-memory similarity index may be built during the deduplication process of the initial snapshot. This index contains representations of only the data of the initial snapshot, and is therefore small and enables efficient access. The index may be denoted as "intra-snapshot similarity index". This model leverages the higher frequency of similar data inside data sets. Also note that for an initial snapshot, the full data of the snapshot is provided in the input, thus the mechanisms of the illustrated embodiments are able to calculate a representative value for each of the input similarity units.

In one embodiment, for each similarity unit, first the intra-snapshot similarity index is searched for similar data, and only if no similar data is found or deduplication with the found similar data is insufficient—the embodiment proceeds to search in the global similarity index. When processing of the entire initial snapshot is complete, the intra-snapshot similarity index is integrated into the global similarity index. This is done using an efficient method; for example if the indexes are search trees, then the tree of the intra-snapshot index can be merged structurally into the tree of the global similarity index, or its entries can be bulk inserted into the global similarity index, depending on the type of the tree.

An additional optimization in this context is that the intra-snapshot similarity index can be built using a resolution that is higher than the resolution of the the global similarity index. Namely, the similarity units used to build and to search within the intra-snapshot similarity index can be smaller than the similarity units used for the global index, thus providing higher resolution similarity search within a snapshot. This is enabled because the intra-snapshot similarity index is smaller typically in orders of magnitude relative to the global similarity index. This is further enabled, as the mechanisms of the illustrated embodiments allow for representative values of a lower resolution to be efficiently calculated from representative values of a higher resolution. Namely, the representative values of the intra-snapshot similarity index are efficiently combined to produce representative values for searching in and later inserting into the global similarity index.

An additional aspect of the mechanisms of the illustrated embodiments concerns a set of techniques that enable to further reduce the IO consumption and size of the similarity index. The challenge being addressed is that for large data repositories or repositories that accommodate frequent snapshots, the IO consumption required for the search and update operations on the similarity index can be high. The inventive techniques to address this challenge are outlined, following.

A first technique provides that the similarity index represents only a latest generation of the repository data. Namely, for each representative value, a single latest entry is maintained.

A second technique provides for implicit deletion in the similarity index. The problem addressed is that deletion is not limited and does not depend on the rate of incoming data, and can therefore create a high load of IO operations on the similarity index. Based on experience from current deduplication mechanisms, explicit deletion is typically a highly resource consuming operation. In the mechanisms of the illustrated embodiments, entries in the similarity index become designated to be removed when a snapshot is deleted, and when a new snapshot is processed and its new representative values replace existing representative values (which become designated to be removed). These operations do not perform explicit deletion in the present invention, and entries designated to be removed by these operations are then either updated by new snapshots (thus reducing IO consumption) or identified and removed within search operations. The details of these techniques are provided further, following.

A third technique provides that while, for example, the 20 bytes (or more) of the cryptographic hash value that constitutes the digest value, only 8 bytes are stored in the similarity index. In one embodiment, a similarity index entry consists of 8 bytes that are a subset of the digest value of a representative value, and 8 bytes that are a storage reference to the digests of the similarity unit to which the current representative value corresponds to. The 8 byte space provides a sufficient distribution and uniqueness for the representative values, and the 12 remaining bytes are stored within the digests of a similarity unit and are verified within a search operation to validate that an input and a repository representative values indeed match.

Now that some context for various aspects of the illustrated embodiments have been introduced, as well as challenges and inventive techniques and methodologies to address them, the following describes the functionality inherent in the mechanisms of the illustrated embodiments for providing deduplication functionality for input snapshot data. This functionality is also illustrated by the method 700 shown in FIGS. 7A and 7B, which depicts an exemplary method 700 for providing deduplication functionality for input snapshot data, in which aspects of the present invention may be implemented.

Figure 7A:
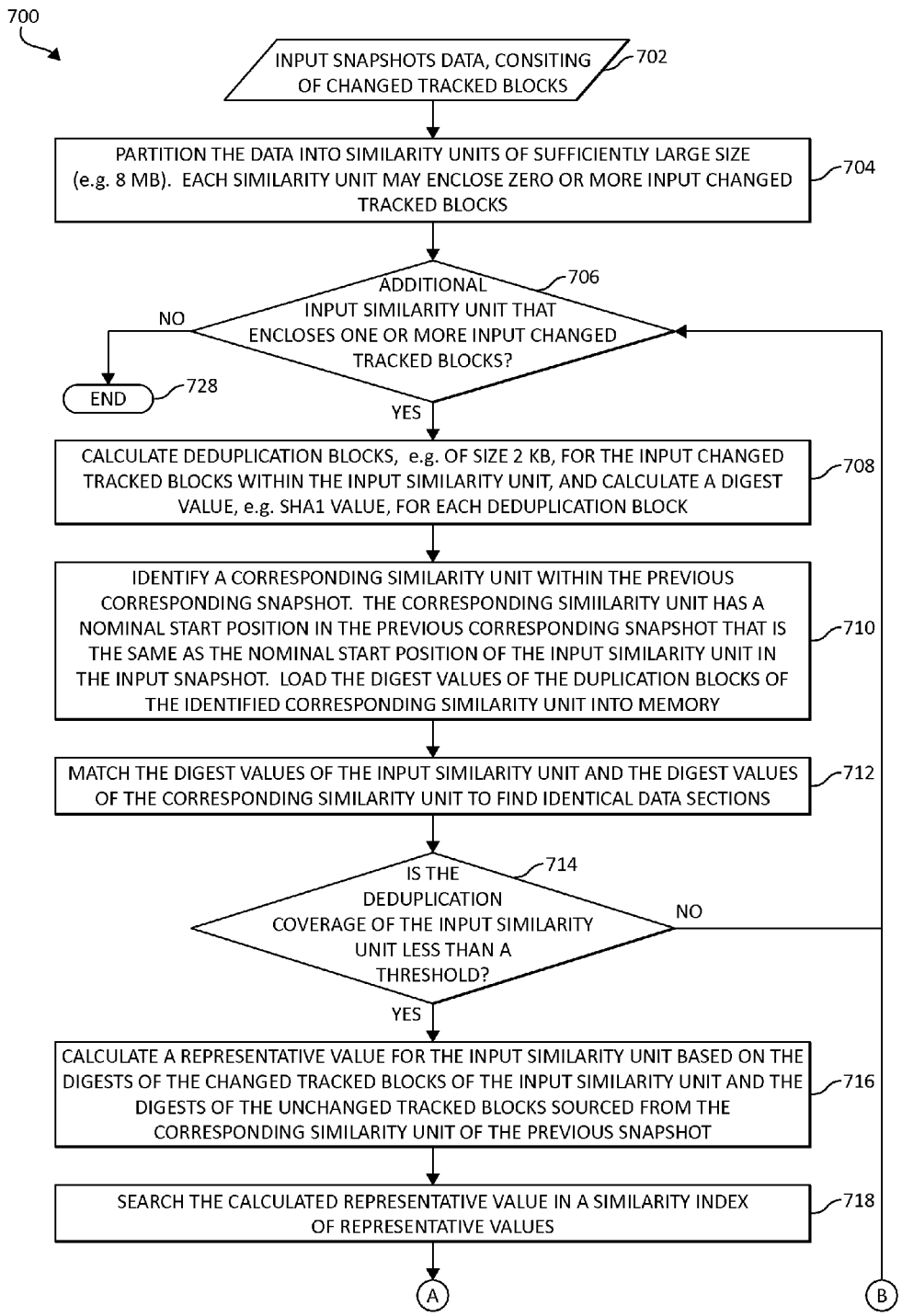
FIG. 7A is a first portion of a flow chart diagram illustrating exemplary functionality for deduplicating input snapshot data, again in which aspects of the present invention may be realized.

Method 700 in FIG. 7A begins with the input of a set of changed tracked blocks, where the size of each of the changed tracked blocks is, for example, 64 KB, and the blocks' positions in the storage are arbitrary and depend on the modification of data in the storage between the time of the previous snapshot and the time of the current snapshot. This is described and depicted in step 702 as shown.

In a subsequent step 704, the data is partitioned into similarity units of a sufficiently large size, (e.g., 8 Megabytes). A sufficiently large size is such that representing all the similarity units in a repository requires a storage size that is sufficiently small. Each similarity unit may enclose zero or more input changed tracked blocks. In decision step 706, method 700 queries whether there is an additional input similarity unit that encloses one or more input changed tracked blocks. If no, the method 700 then ends (step 728). If so, for each input similarity unit that encloses one or more input changed tracked blocks, deduplication blocks (e.g., of size 2 KB), are calculated for the input changed tracked blocks within the input similarity unit, and a digest value, e.g. SHA-1 value, is calculated for each deduplication block (step 708).

In a subsequent step, a corresponding similarity unit within the previous corresponding snapshot is identified. The corresponding similarity unit has a nominal start position in the previous corresponding snapshot that is the same as the nominal start position of the input similarity unit in the input snapshot. The digest values of the deduplication blocks of the identified corresponding similarity unit are loaded into memory (step 710).

The digest values of the input similarity unit and the digest values of the corresponding similarity unit are matched to find identical data sections (step 712).

Method 700 then moves to decision step 714, which queries whether the deduplication coverage of the input similarity unit is less than a threshold. If the coverage is not less than a threshold, the method 700 returns to step 706 as shown. If the coverage is indeed less than a threshold, then the method 700 continues to process the current input similarity unit as follows.

A representative value is calculated for the input similarity unit based on the digests of the input similarity unit and the digests of the corresponding similarity unit of the previous snapshot (step 716). Specifically, the digests of the unchanged tracked blocks sourced from the corresponding similarity unit are considered together with the digests of the changed tracked blocks of the input similarity unit, to calculate the representative value.

Figure 7B:
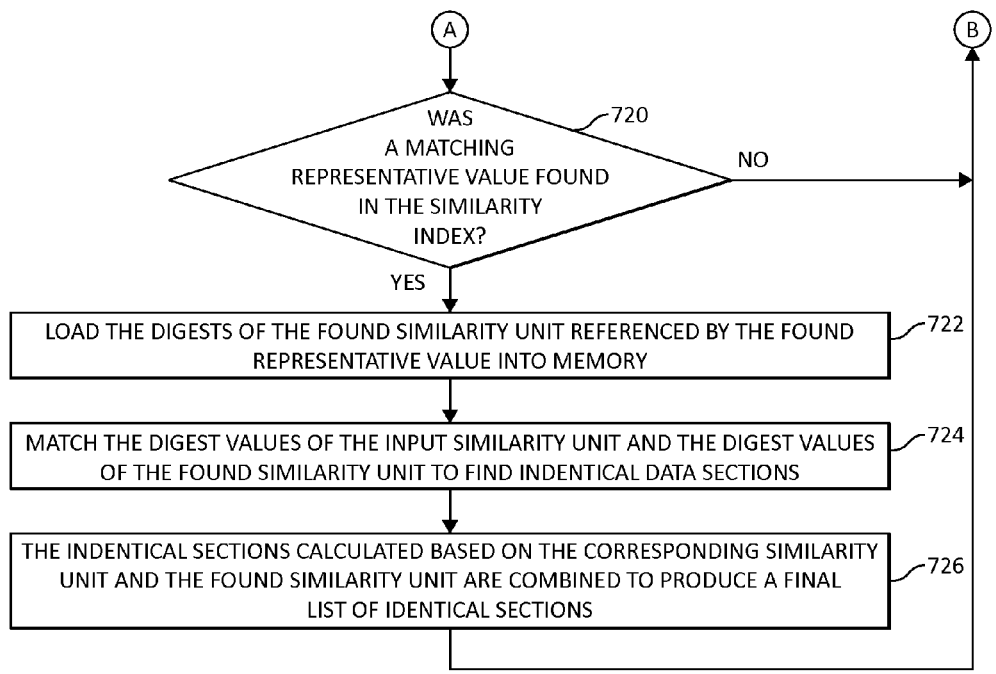
FIG. 7B is a second portion of the flow chart diagram first illustrated in FIG. 7A, previously.

The calculated representative value is searched in a similarity index of representative values. (step 718). Turning now to FIG. 7B, which continues the exemplary method previously began in FIG. 7A, previously, if a matching representative value is not found in the similarity index (decision step 720), then the method 700 proceeds to process the next input similarity unit (returning to step 706 as previously). If a matching representative value is found, then the method 700 continues to process the current input similarity unit as follows.

The digests of the found similarity unit referenced by the found representative value are loaded into memory (step 722). The digest values of the input similarity unit and the digest values of the found similarity unit are matched to find identical data sections (step 724). Finally, the identical sections calculated based on the corresponding similarity unit and the found similarity unit are combined to produce a final list of identical sections (step 726). The method 700 then proceeds to process the next input similarity unit by returning to step 706 as previously.

Exemplary methodologies for processing a single input similarity unit are now described. In one embodiment, deduplication blocks, (e.g., of size 2 KB), are calculated for each one of the changed tracked blocks within the input similarity unit. The boundaries of the deduplication blocks can be calculated using a contents defined chunking method, for example, that provides variable sized deduplication blocks. For each deduplication block a cryptographic hash value, e.g. a SHA-1 value, named a digest value, is calculated. The information of a digest includes the digest value and the position and size of the corresponding deduplication block.

The digests of a similarity unit are stored in a continuous storage segment, where their order in the storage segment corresponds to their order of appearance in the data. Each storage segment corresponds to a specific similarity unit. A representative value entry in the similarity index contains a storage reference that enables to efficiency identify the location in the storage of the digest storage segment corresponding to the similarity unit represented by the entry.

Figure 8:
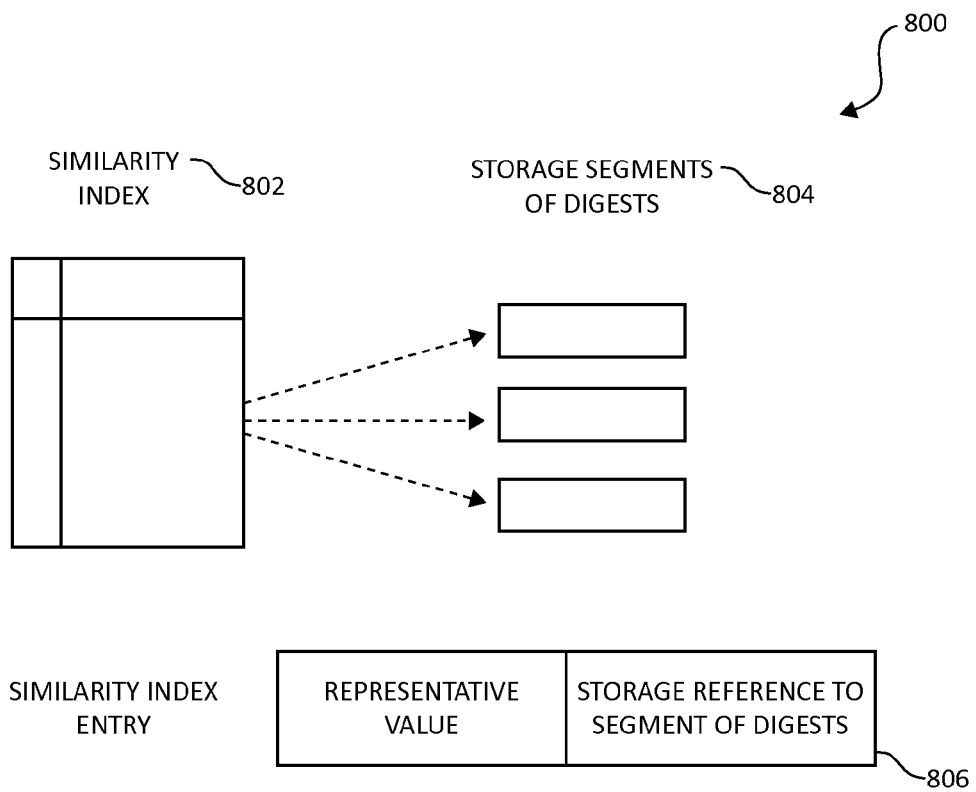
FIG. 8 is a block diagram of an exemplary deduplication similarity index and digest storage segments, again in which aspects of the present invention may be implemented.

FIG. 8, following, in illustration 800, depicts the metadata layout. An exemplary similarity index 802 referencing representative storage segments of digests 804 that are referenced by entries in the similarity index as shown. Each similarity index entry 806 includes a corresponding representative value as previously described that was calculated, and a storage reference to a segment of digests that enables to efficiency identify the location in the storage of the digest storage segment corresponding to the similarity unit represented by the entry.

Accordingly, in one embodiment, each storage segment has a metadata section that includes the following components: (1) CRC; (2) the position in the storage segment of the representative digest of the similarity unit corresponding to the storage segment; (3) the identification of the latest snapshot that updated the storage segment; and (4) a map of nominal base positions for sub-sections of the storage segment, which enables efficient position calculation of a specific digest in a segment (as the digest blocks are of variable size).

In the mechanisms of the illustrated embodiments, a digests storage segment has a fixed physical size and a fixed nominal size. Examples of these sizes may be a 48 KB physical size and an 8 MB nominal size. The fixed physical and nominal sizes enable O(1) addressing of digests storage segments. Namely, given an input nominal position, the physical position of the digests storage segment covering the input nominal position is known in O(1). The physical and nominal sizes of a digests storage segment are calculated to provide a minimal probability of excess digests per storage segment and be IO efficient. Representative digests for similarity units are calculated based on the maximal number of digests for a storage segment, thus avoiding excess digests that are not stored. This is a repeatable calculation method that is optimized for the above design of digests storage segments.

Input and repository digests may be matched using a digests matching algorithm. This algorithm, for example, loads one set of digests into a hash table, and searches using the hash table for each of the digests of the other set. For each match found, the match is attempted to be extended with consecutive matching digests. A pair of digests are determined as matching when their cryptographic hash values and their deduplication block sizes match.

Figure 9:
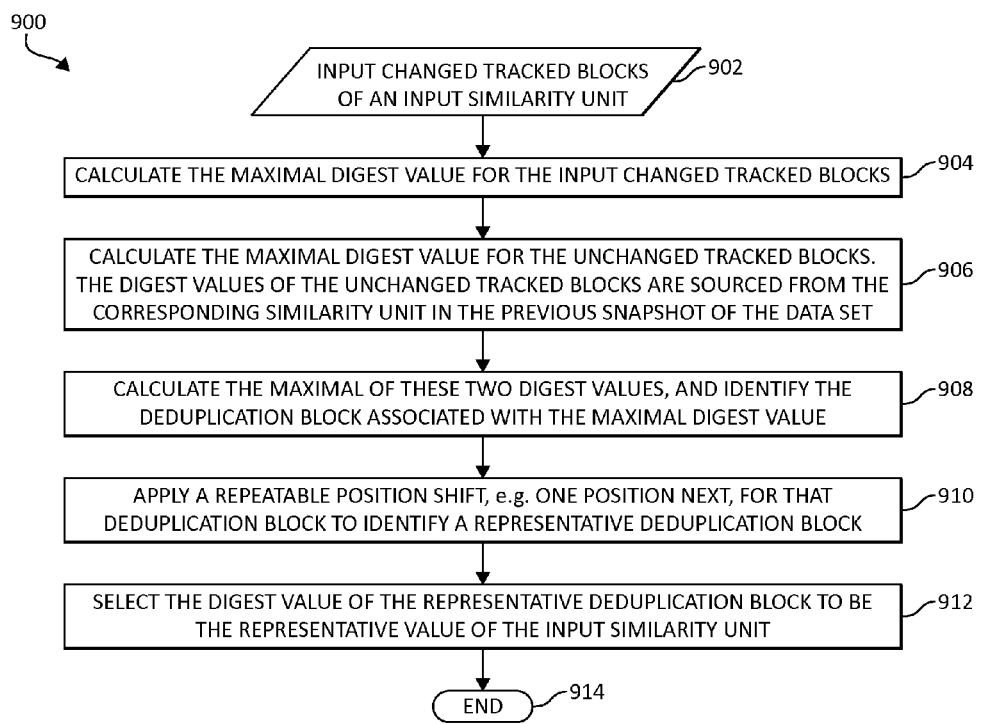
FIG. 9 is a flow chart diagram illustrating exemplary functionality for calculating a representative value for a similarity unit in a snapshot data set, again in which aspects of the present invention may be implemented.

Turning now to FIG. 9, following, an exemplary method 900 for calculating a representative value for an input similarity unit in an input snapshot is shown, in which aspects of the present invention may be implemented. As an introductory step, the input for the method 900 is a set of changed tracked blocks of an input similarity unit (step 902). Note that only the data of the input changed tracked blocks is available in the input, and the data of the unchanged tracked blocks is not available in the input.

In step 904, the maximal digest value is calculated for the input changed tracked blocks. This is done during the calculation of the digest values for the input changed tracked blocks (these digest values are required for deduplication on the input data). In a subsequent step 906, the maximal digest value for the unchanged tracked blocks is calculated. This is done based on the digest values of the unchanged tracked blocks. These digest values are sourced from the corresponding similarity unit in the previous snapshot of the data set. In the exemplary method 900, these digest values are already loaded into memory to facilitate deduplication with the corresponding similarity unit.

Additional optimizations are provided to the method 900, as follows, in one embodiment. If the maximal digest value is stored for each tracked block, then rather than using the digests these stored maximal digest values may be used to calculate the maximal digest value for the unchanged tracked blocks. Additionally, if the maximal digest value is stored for each similarity unit (rather than for each tracked block), then if the input changed tracked blocks do not overwrite the position of the stored maximal digest value then the stored maximal digest value is valid to be used in the calculation as the current maximal digest value for the unchanged tracked blocks. Only in the case where the input changed tracked blocks overwrite the position of the stored maximal digest value and the maximal digest value of the input changed tracked blocks is smaller than the stored maximal digest value, then a maximal digest value is calculated for the unchanged tracked blocks.

In a subsequent step 908, the maximal of these two digest values is calculated, and the deduplication block associated with the maximal digest value is identified. This deduplication block can be either in the changed tracked blocks or in the unchanged tracked blocks.

A repeatable position shift, (e.g., one position next), is applied for that deduplication block to identify a representative deduplication block (step 910). Finally, the digest value of the representative deduplication block is selected to be the representative value of the input similarity unit (step 912). The method 900 ends (step 914).

Figure 10:
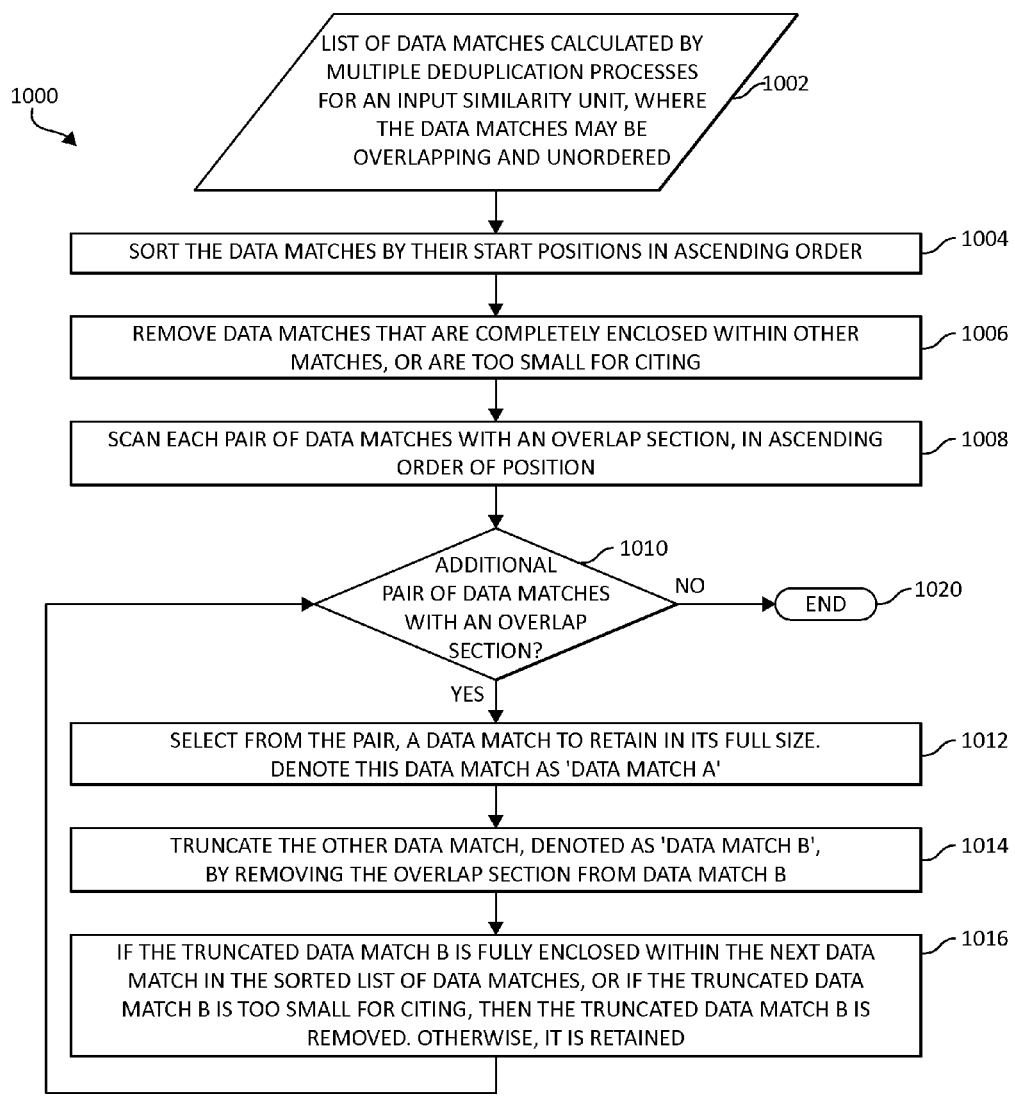
FIG. 10 is a flow chart diagram illustrating exemplary functionality for combining matches calculated in multiple deduplication processes to produce a unified and efficient list of matches, again in which aspects of the present invention may be implemented.

FIG. 10, following, illustrates an exemplary method 1000 for combining data matches calculated in multiple deduplication processes for an input similarity unit, to produce a unified and efficient list of data matches, in which aspects of the present invention may be implemented. In the depicted embodiment, a 'data match' is defined as a sequence of matching bytes in the input and reference data.

The input is a list of data matches calculated by multiple deduplication processes for an input similarity unit, where the data matches may be overlapping and unordered (step 1002). The data matches are sorted by their start positions in ascending order (step 1004). Data matches that are completely enclosed within other matches, or are determined to be too small for citing, are removed (step 1006). Each pair of the data matches having an overlap section is then scanned in an ascending order of position (step 1008).

Continuing to decision step 1010, which queries whether an additional pair of data matches having an overlap section is available (if no, the method 1000 ends in step 1020), for each such pair: (1) a data match is selected from the pair to retain in its full size; this data match is denoted as 'data match A' (step 1012); (2) the other data match, denoted as 'data match B', is truncated by removing the overlap section from data match B so that it will not overlap with data match A (step 1014); this truncation process may cause the truncated data match B to become fully enclosed within the next data match in the sorted list of data matches; (3) if the truncated data match B is fully enclosed within the next data match in the sorted list of data matches, or if the truncated data match B is determined to be too small for citing, then the truncated data match B is removed; otherwise the truncated data match B is retained (step 1016). The method 1000 then moves to process the next pair of data matches having an overlap section (returning to decision step 1010 as previously).

Selection of the data match to retain in its full size from a pair of data matches may be based on a variety of criteria. In one embodiment, the selection of the data match may be determined by which of the pair has a maximal size. In another embodiment, the selection may be determined by the data match whose position in the reference data is closest to the positions of any previous selected data matches. In still another embodiment, the selection may be determined by a combination of the previous criteria. Any other selection criteria may also be used in a data match determination.

Figure 11:
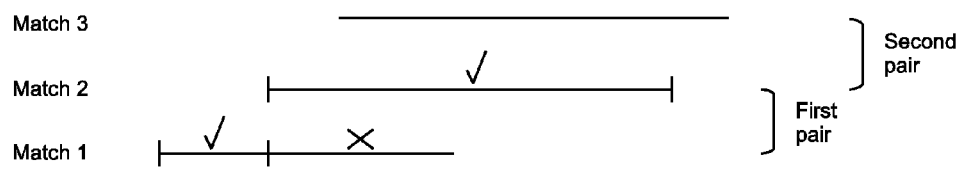
FIG. 11 is an illustration of exemplary cases in processing of pairs of data matches, including truncating, retention and removal of data matches according to various aspects of the present invention.
Figure 11:
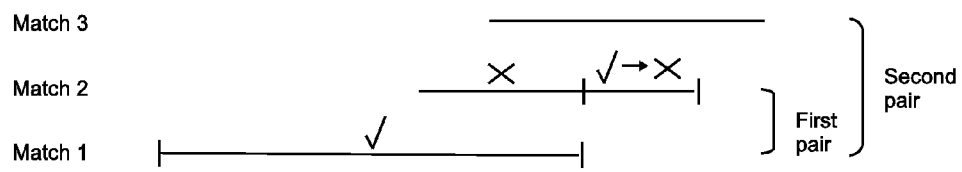
Figure 11:
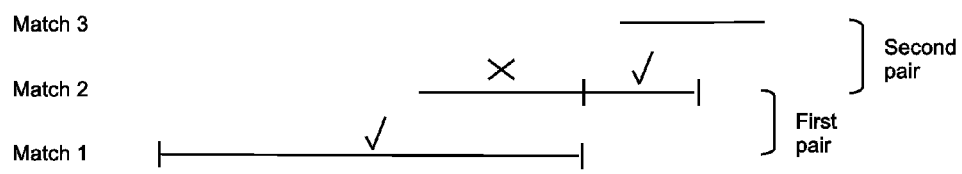

FIG. 11, following, graphically illustrates the processing performed for each pair of data matches, including truncation, retention and removal operations described in FIG. 10, previously, as shown in three example cases. In the depicted 'Case A,' in the processing of data matches 1 and 2, data match 2 is larger and is retained in its full size, while data match 1 is truncated with the overlap section, and its truncated form is retained. The next pair to process is data matches 2 and 3 as shown.

In the depicted 'Case B,' in the processing of data matches 1 and 2, data match 1 is determined to be larger and is retained in its full size, while data match 2 is truncated with the overlap section. The truncated form of data match 2 is fully enclosed within data match 3; therefore, data match 2 is removed, and the next pair to process is data matches 1 and 3 as shown.

Finally, in the depicted 'Case C,' in the processing of data matches 1 and 2, data match 1 is determined to be larger and is retained in its full size, while data match 2 is truncated with the overlap section. The truncated form of data match 2 is not fully enclosed within data match 3; therefore, the next pair to process is data matches 2 (truncated) and 3 as shown.

Figure 12A:
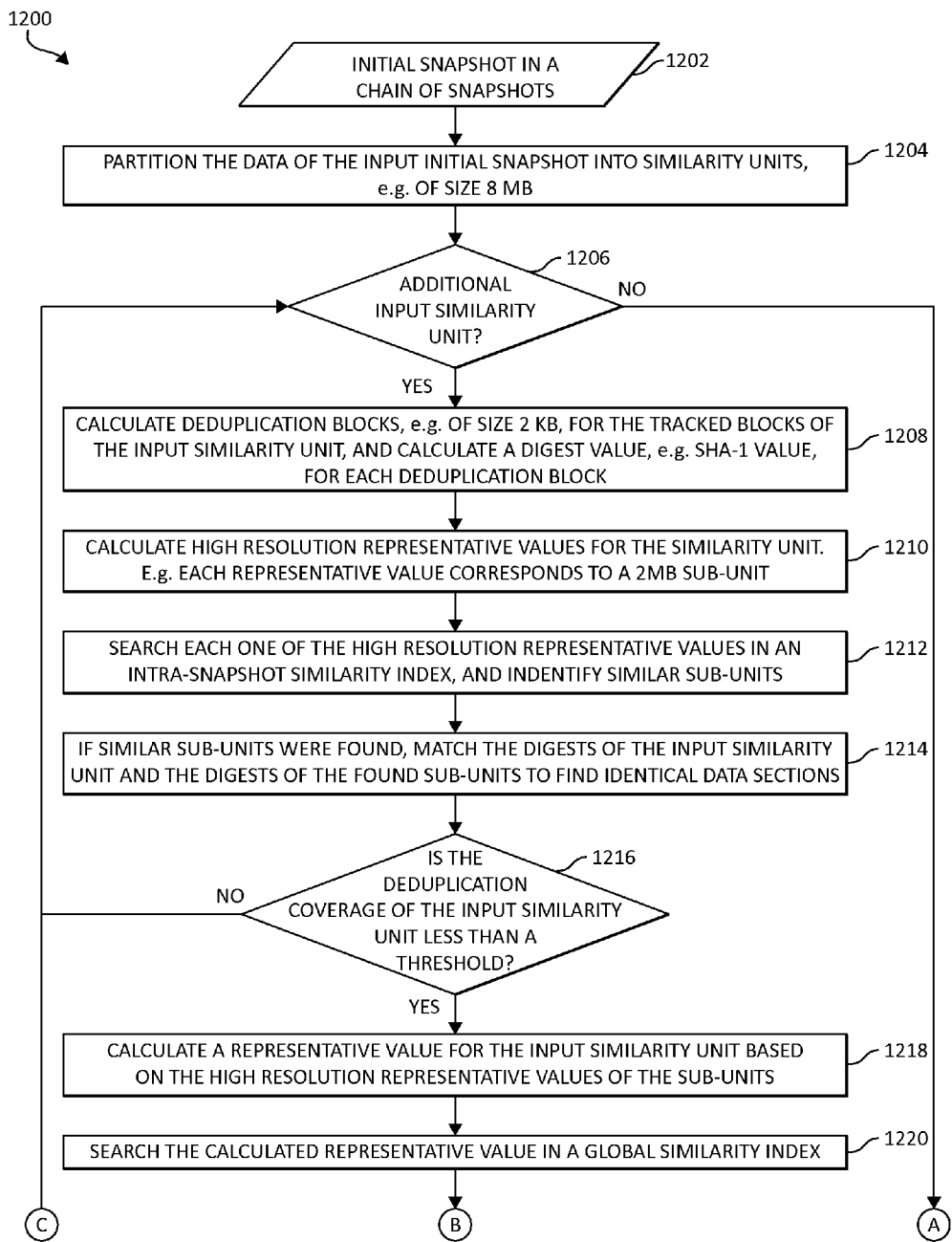
FIG. 12A is a first portion of a flow chart diagram illustrating exemplary functionality for deduplicating an initial snapshot in a chain of snapshots, again in which aspects of the present invention may be implemented.
Figure 12B:
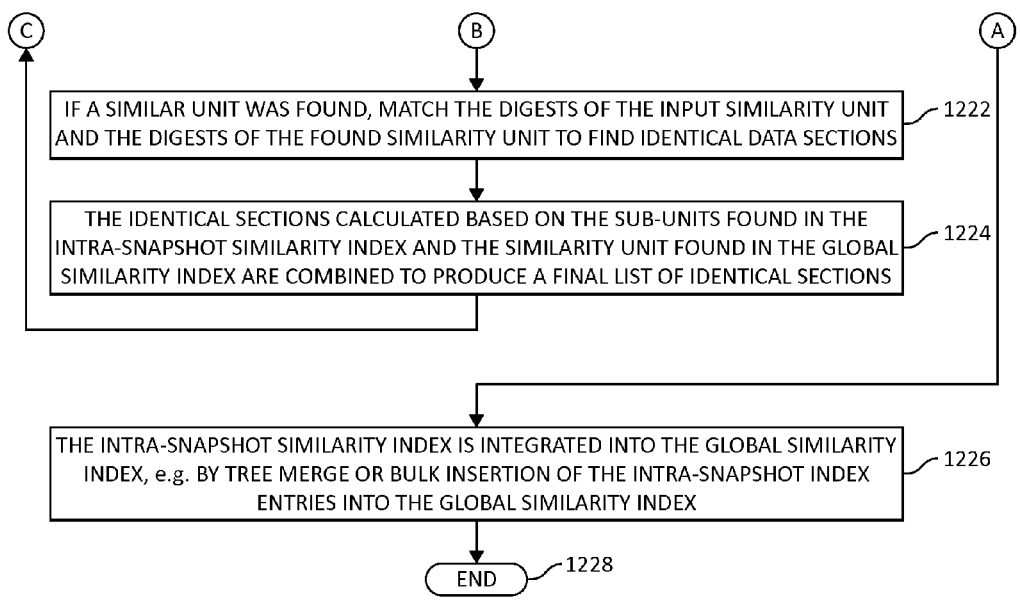
FIG. 12B is a second portion of the flow chart diagram first illustrated in FIG. 11A previously.

FIGS. 12A and 12B, following, depict an exemplary method 1200 for deduplicating an initial snapshot in a chain of snapshots according to one embodiment of the present invention, namely a snapshot that does not have a preceding snapshot of the same data set. Turning first to FIG. 12A, in step 1202, the input to the method 1200 is an initial snapshot in a chain of snapshots. The data of the input initial snapshot is then partitioned into similarity units (e.g., of size 8 MB) (step 1204).

Method 1200 then moves to decision step 1206, which queries whether an additional input similarity unit is available in the input initial snapshot. In other words, for each input similarity unit, the method 1200 moves to step 1208 as shown, to calculate deduplication blocks (e.g., of size 2 KB) for the tracked blocks of the input similarity unit. In addition, a digest value, (e.g., SHA-1 value), is calculated for each deduplication block. If an additional input similarity unit is not found, the method 1200 moves to step 1226 in FIG. 12B, as will be further described.

Continuing to step 1210, high resolution representative values are calculated for the similarity unit (e.g., each representative value corresponds to a 2 MB sub-unit). Each one of the high resolution representative values is searched in an intra-snapshot similarity index, and similar sub-units are identified (step 1212). If similar sub-units were found, then the digests of the input similarity unit and the digests of the found sub-units are matched to find identical data sections (step 1214).

The method 1200 then proceeds to decision step 1116, which queries whether the deduplication coverage of the input similarity unit is lower than a threshold. If so, then the method 1200 proceeds to steps 1218, 1220, 1222 and 1224 as follows. If not, the method 1200 returns to decision step 1206 as shown.

Returning to decision step 1216, and following the progression of method 1200 through the assumption that the examined deduplication coverage of the input similarity unit is lower than a threshold, a representative value is calculated for the input similarity unit based on the high resolution representative values of the sub-units in a subsequent step 1218. The calculated representative value is then searched in a global similarity index (step 1220).

Turning now to FIG. 12B, and continuing with step 1222, if a similar unit was found, then the digests of the input similarity unit and the digests of the found similarity unit are matched to find identical data sections. The identical sections calculated based on the sub-units found in the intra-snapshot similarity index and the similarity unit found in the global similarity index are combined to produce a final list of identical sections (step 1224).

Returning now to decision step 1206 in FIG. 12A, and assuming that no additional input similarity unit is available in the input initial snapshot (in other words, when processing of all the input similarity units of the input initial snapshot has been completed), the method 1200 moves to step 1226 as follows. The intra-snapshot similarity index is integrated into the global similarity index, e.g. by tree merge or bulk insertion of the intra-snapshot index entries into the global similarity index. The method 1200 then ends (step 1228).

Several inventive aspects may be applied as part of the mechanisms of the illustrated embodiments to further reduce the IO consumption and size of the similarity index. In one embodiment, each entry in the similarity index may be configured with e.g. 8 bytes that are a subset of the representative digest value of the corresponding similarity unit, and e.g. 8 bytes that are a storage reference to the digests segment of the corresponding similarity unit. The former 8 bytes are a subset of the e.g. 20 bytes (or more) of the cryptographic hash value that constitutes the representative digest value.

Figure 13:
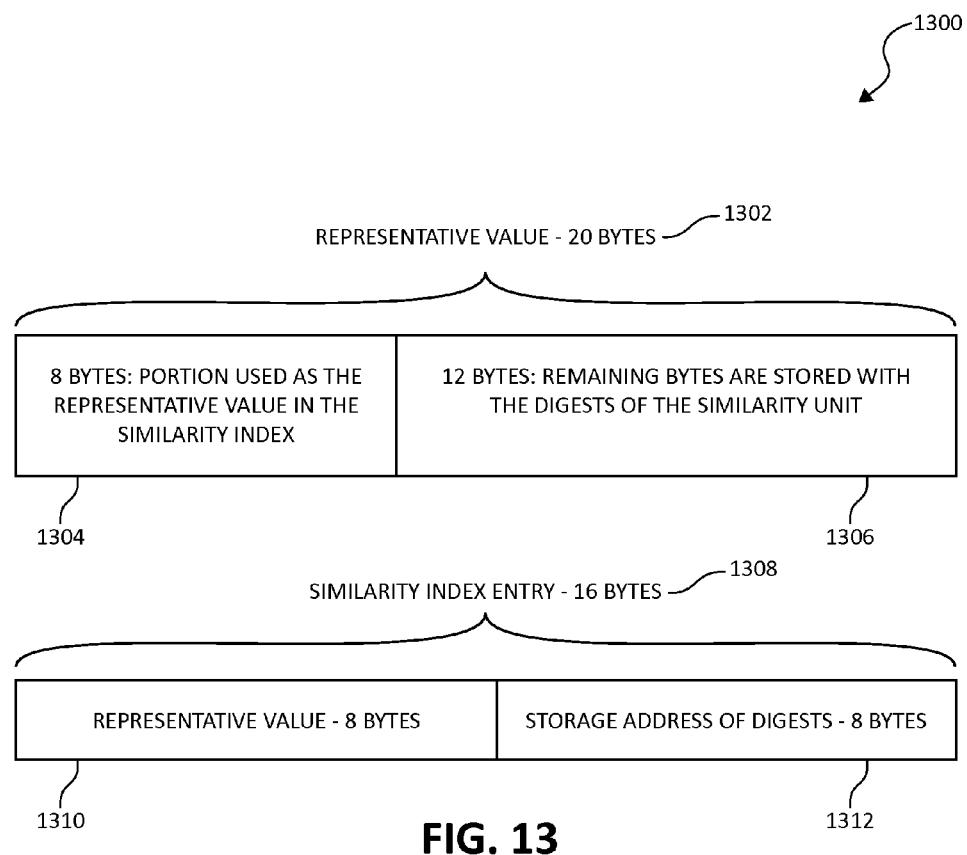
FIG. 13 is a block diagram of an exemplary partition of a representative value and the structure of an entry in the similarity index, again in which aspects of the present invention may be implemented.

The embodiment just described is depicted as illustration 1300 in FIG. 13, following, to show an exemplary partition of a representative value and the structure of an entry in the similarity index. A representative value 1302 of, for example 20 bytes, incorporates a portion used as the representative value in the similarity index, of size for example 8 bytes (portion 1304), and a remaining portion that is stored with the digests of the similarity unit, of size for example 12 bytes (portion 1306). The 8-byte space in portion 1304 provides a sufficient distribution and uniqueness for the representative values, and the 12 remaining bytes in portion 1306 are stored in the representative digest record which is stored in the digests segment of the corresponding (referenced) similarity unit. These 12 bytes are verified within a search operation to validate that an input and a repository representative values indeed match. Namely, when a match is found in the similarity index (based on the 8 bytes subset), the remaining 12 bytes of the representative value are obtained and verified to match the input representative value. Similarity index entry 1308, e.g. of size 16 bytes, then includes a portion 1310 storing a representative value, of size for example 8 bytes, and a portion 1312 used to store a storage address of the corresponding digests segment, of size for example 8 bytes.

In another inventive aspect, in one embodiment, the similarity index is configured to represent only a latest generation of the repository data. Namely, for each representative value, a single latest entry is maintained. Specifically, when a new representative value has a value which is equal to that of an existing representative value, the new value overwrites the existing value.

In an additional inventive aspect, in one embodiment, implicit deletion is applied in the similarity index. In the mechanisms of the illustrated embodiments, explicit deletion operations are not performed, and entries designated to be removed are either updated by new snapshots (thus reducing IO consumption) or identified and removed within search operations. There are two cases, specified next as exemplary embodiments, where entries in the similarity index are designated to be removed.

In the first case, a new snapshot is processed and its new representative values replace existing representative values. A new snapshot adds only the representative values of the changed similarity units in the snapshot. The representative values of the unchanged similarity units remain as is. Consider a changed similarity unit that contributes a representative value into the similarity index. If the new representative value of the similarity unit is equal to its previous representative value (i.e., the change in the data did not cause change in the representative value), then the new representative value will replace, and thus also implicitly delete, the previous representative value. If the new representative value of the similarity unit is different from its previous representative value, then the previous representative value of that similarity unit remains in the index and is designated to be removed. The methods for identifying and processing such representative values are specified in the following.

In the second case, an existing snapshot is deleted. Explicit deletion of entries is not performed, and therefore the representative values of a deleted snapshot remain in the index as designated to be removed, and the methods for identifying and processing such representative values are specified in the following. Entries in the similarity index that become designated to be removed by any of the above processes (i.e., new snapshot processing, deletion of a snapshot) are then processed by one of two exemplary processes.

In a first exemplary process, an entry designated to be removed may be updated directly by a new entry that has the same representative value (but references different digests). In this way the entry designated to be removed is overwritten (and thus removed) by the new entry.

In a second exemplary process, an entry designated to be removed may be processed by a search operation of a given representative value. Processing of such entries is classified into the following cases.

In the first case the storage reference to a digests segment is no longer valid. In this case the invalid storage reference will be identified as such by the search operation, and the entry will be removed within the search operation.

In the second case the storage reference to a digests segment is reused by another similarity unit and is therefore valid, but the representative value of that similarity unit is different from the representative value designated to be removed. In this case, the search operation checks if the two representative values match (checking their full size, e.g., 20 bytes), and because they are different, the search operation will identify the entry designated to be removed, and will remove that entry.

In the third case the storage reference to a digests segment is reused by another similarity unit and is therefore valid, and the representative value of that similarity unit is equal to the representative value designated to be removed. In this case the new representative value directly updates (overwrites) the existing representative value, and therefore this case is equivalent to the first case above.

The functionality imparted by implicit deletion in the illustrated embodiments serves to reduce IO operations by embedding removal of entries designated for removal within update operations and search operations. With explicit deletion the cost for removing entries is paid upfront, while with implicit deletion as suggested herein, the cost is deferred and only a portion of that cost is eventually applied (for removal of entries that were processed by a search operation before being processed by an update operation). Furthermore, entries designated for removal that exist in the index are safe in terms of deduplication.

Figure 14:
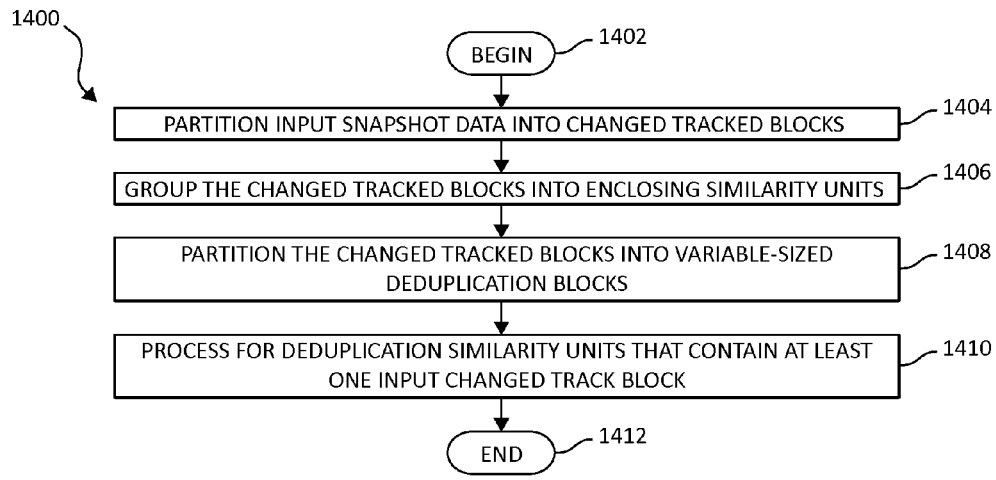
FIG. 14 is a flow chart diagram of an exemplary method for processing of tracked blocks in similarity based deduplication of snapshots data, in accordance with one embodiment of the present invention.

Turning now to FIG. 14, method 1400 illustrates an exemplary method for processing tracked blocks in a data storage implemented with data deduplication by a processor, in which various aspects of the present invention may be implemented. Method 1400 begins (step 1402) with the partitioning of input snapshot data into changed tracked blocks (step 1404). The changed tracked blocks are then grouped into enclosing similarity units (step 1406). The changed tracked blocks are then partitioned into variable-sized deduplication blocks (step 1408). Finally, those similarity units that contain at least one input changed tracked block are processed for deduplication (step 1410). The method 1400 then ends (step 1412).

Figure 15:
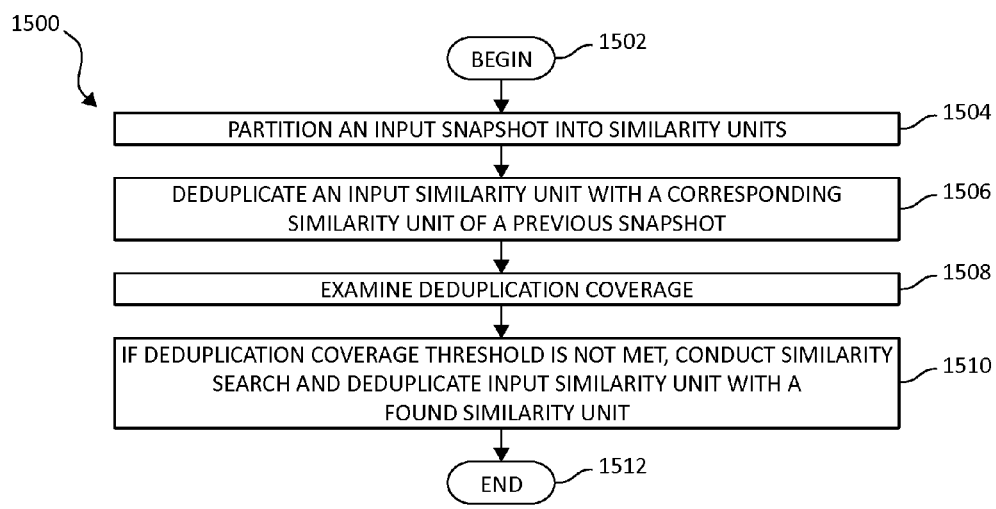
FIG. 15 is a flow chart diagram of an exemplary method for similarity based deduplication of snapshots data, in accordance with one embodiment of the present invention.

FIG. 15, following, illustrates an exemplary method 1500 for deduplication of an input snapshot in a data storage by a processor, in which aspects of the present invention may be implemented. The method 1500 begins (step 1502). An input snapshot data is partitioned into similarity units 1504. The input similarity unit is deduplicated with a corresponding similarity unit of a previous snapshot (step 1506). Deduplication coverage is examined (step 1508). If a deduplication coverage threshold is not met, a similarity search is conducted and the input similarity unit is deduplicated with a found similarity unit (step 1510). The method 1500 then ends (step 1512).

Figure 16:
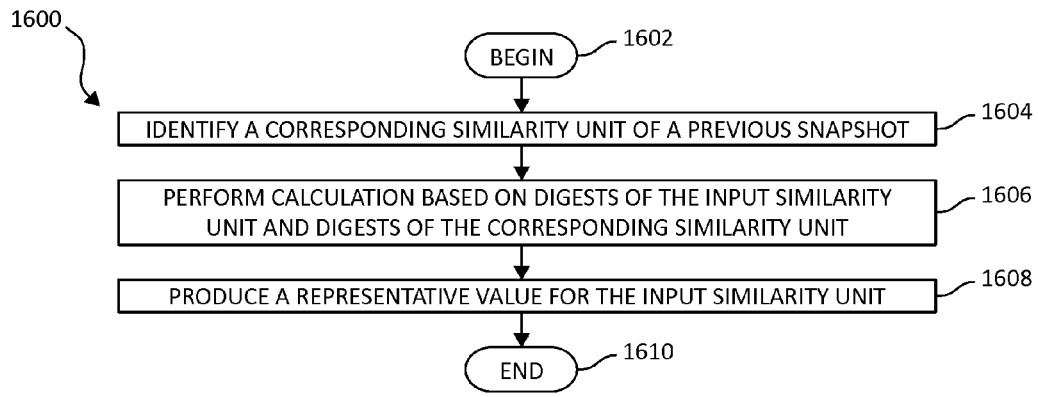
FIG. 16 is a flow chart diagram of an exemplary method for calculating representative values for similarity units in deduplication of snapshots data, in accordance with one embodiment of the present invention.

FIG. 16, following, illustrates an exemplary method 1600 for calculating a representative value for an input similarity unit in data deduplication of snapshots data by a processor, again in which various aspects of the present invention may be implemented. Method 1600 begins (step 1602) with the identification of a corresponding similarity unit of a previous snapshot that corresponds to an input similarity unit (step 1604). A calculation is performed based on digests of the input similarity unit and digests of the corresponding similarity unit (step 1606). Based on the calculation, a representative value is produced for the input similarity unit (step 1608). The method 1600 then ends (step 1610).

Figure 17:
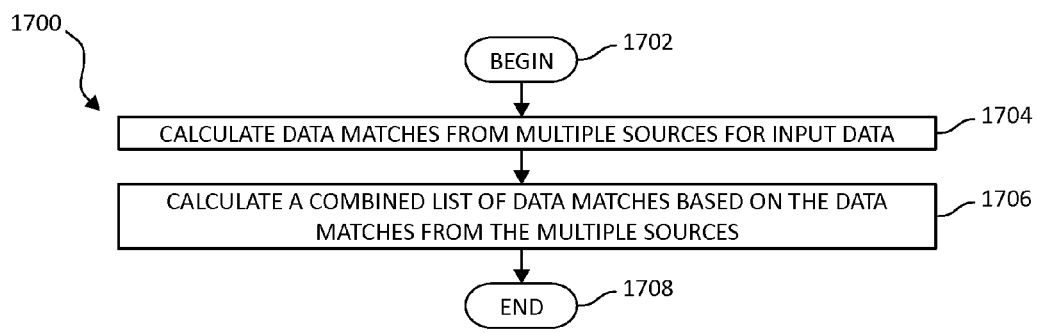
FIG. 17 is a flow chart diagram of an exemplary method for combining data matches from multiple sources in a deduplication storage system, in accordance with one embodiment of the present invention.

FIG. 17, following, illustrates an exemplary method 1700 for combining input data matches from multiple sources in deduplication of data in data storage by a processor, according to one embodiment the present invention. Method 1700 begins (step 1702) with the calculation of input data matches using a plurality of deduplication processes referencing a plurality of repository data segments for the input data (step 1704). A combined list of output data matches, is then calculated (step 1706). The method 1700 then ends (step 1708).

Figure 18:
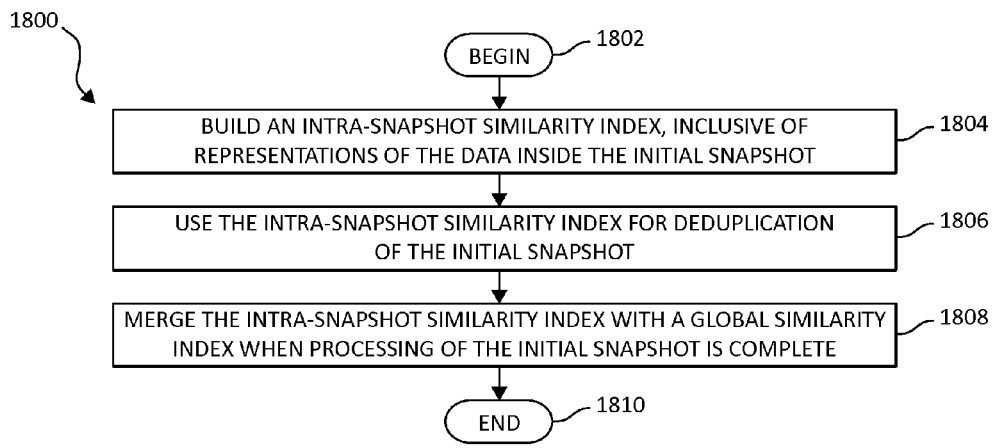
FIG. 18 is a flow chart diagram of an exemplary method for similarity based data deduplication of initial snapshots of data sets, in accordance with one embodiment of the present invention.

Turning now to FIG. 18, an exemplary method 1800 for data deduplication of an initial snapshot of a data set in a storage system by a processor, is depicted. Method 1800 begins (step 1802) with the building of an intra-snapshot similarity index, inclusive of representations of the data inside the initial snapshot (step 1804). The intra-snapshot similarity index is then used for deduplication of the initial snapshot (step 1806). The intra-snapshot similarity index is then merged with a global similarity index when processing of the initial snapshot is complete (step 1808). The method 1800 then ends (step 1810).

Figure 19:
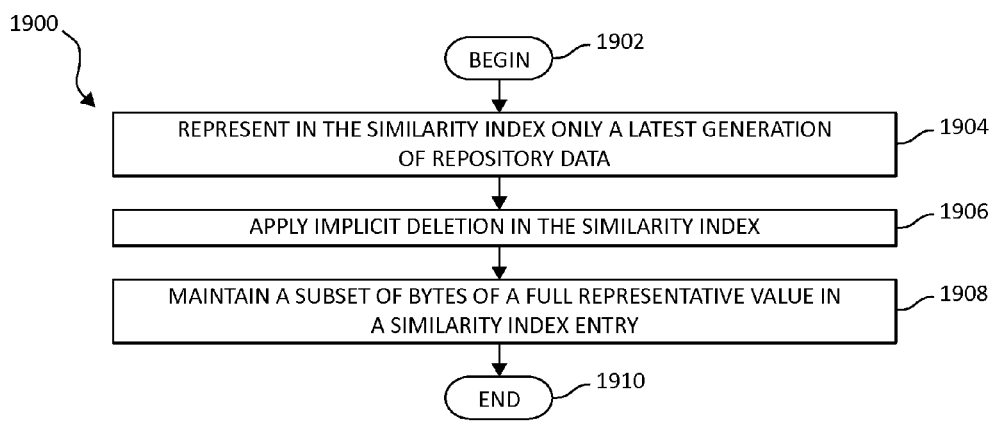
FIG. 19 is a flow chart diagram of an exemplary method for reducing resource consumption of a similarity index in data deduplication, again in accordance with one embodiment of the present invention.

FIG. 19, following, illustrates an exemplary method 1900 for reducing resource consumption of a similarity index in data deduplication by a processor according to one embodiment of the present invention. Method 1900 begins (step 1902), by representing in the similarity index only a latest generation of repository data (step 1904). Implicit deletion is applied in the similarity index (step 1906). A subset of bytes of a full representative value is maintained in a similarity index entry (step 1908). The method 1900 then ends (step 1910).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for data deduplication of an initial snapshot of a data set in a storage system by a processor, comprising:
    building an intra-snapshot similarity index, inclusive only of representations of the data inside the initial snapshot;
    using the intra-snapshot similarity index for deduplication of the initial snapshot in a chain of a plurality of snapshots by first using only the representations of the data within the intra-snapshot similarity index of the initial snapshot to perform the deduplication of the initial snapshot prior to using a global similarity index to perform the deduplication; wherein the global similarity index is used to perform the deduplication of the initial snapshot subsequent to using the intra-snapshot similarity index when a deduplication threshold is not met using the intra-snapshot similarity index; and
    merging the intra-snapshot similarity index with the global similarity index by performing each of:
        structurally merging the intra-snapshot index into the global similarity index,
        bulk inserting entries of the intra-snapshot index into the global similarity index when unable to structurally merge the intra-snapshot index into the global similarity index, and
        performing the merging of the intra-snapshot index with the global similarity index when deduplication processing of the initial snapshot is complete.

2. The method of claim 1, further including:
    for an input similarity unit, searching the intra-snapshot similarity index for similar data, and
    deduplicating the input similarity unit with found data.

3. The method of claim 1, wherein the intra-snapshot similarity index is built using a resolution that is higher than the resolution of the global similarity index.

4. The method of claim 3, wherein sub-similarity units used to build and to search within the intra-snapshot similarity index are smaller than similarity units used for the global similarity index.

5. The method of claim 4, further including searching high resolution representative values in the intra-snapshot similarity index, and identifying similar sub-units, for matching digests of an input similarity unit and digests of found sub-units to find identical data sections.

6. The method of claim 4, further including calculating a representative value for an input similarity unit based on high resolution representative values of sub-units, the representative value searched in the global similarity index, and a corresponding similarity unit identified for matching digests of the input similarity unit and digests of a found similarity unit to find identical data sections.

7. The method of claim 1, further including configuring the initial snapshot to not have a preceding snapshot of the same data set.

8. The method of claim 1, further including configuring the intra-snapshot similarity index to reside in memory.

9. A system for data deduplication of an initial snapshot of a data set in a storage system, comprising:
    a processor, operable in the storage system, wherein the processor:
        builds an intra-snapshot similarity index, inclusive only of representations of the data inside the initial snapshot,
        uses the intra-snapshot similarity index for deduplication of the initial snapshot in a chain of a plurality of snapshots by first using only the representations of the data within the intra-snapshot similarity index of the initial snapshot to perform the deduplication of the initial snapshot prior to using a global similarity index to perform the deduplication; wherein the global similarity index is used to perform the deduplication of the initial snapshot subsequent to using the intra-snapshot similarity index when a deduplication threshold is not met using the intra-snapshot similarity index, and
        merges the intra-snapshot similarity index with the global similarity index by performing each of:

structurally merging the intra-snapshot index into the global similarity index, bulk inserting entries of the intra-snapshot index into the global similarity index when unable to structurally merge the intra-snapshot index into the global similarity index, and performing the merging of the intra-snapshot index with the global similarity index when deduplication processing of the initial snapshot is complete.

10. The system of claim 9, wherein the processor:

for an input similarity unit, searches the intra-snapshot similarity index for similar data, and deduplicates the input similarity unit with found data.

11. The system of claim 9, wherein the intra-snapshot similarity index is built using a resolution that is higher than the resolution of the global similarity index.

12. The system of claim 11, wherein sub-similarity units used to build and to search within the intra-snapshot similarity index are smaller than similarity units used for the global similarity index.

13. The system of claim 12, wherein the processor searches high resolution representative values in the intra-snapshot similarity index, and identifies similar sub-units, for matching digests of an input similarity unit and digests of found sub-units to find identical data sections.

14. The system of claim 12, wherein the processor calculates a representative value for an input similarity unit based on high resolution representative values of sub-units, the representative value searched in the global similarity index, and a corresponding similarity unit identified for matching digests of the input similarity unit and digests of a found similarity unit to find identical data sections.

15. The system of claim 9, wherein the initial snapshot does not have a preceding snapshot of the same data set.

16. The system of claim 9, wherein the intra-snapshot similarity index resides in memory.

17. A computer program product for data deduplication of an initial snapshot of a data set in a storage system by a processor, the computer program product comprising a computer-readable storage medium having computer-readable program code portions stored therein, the computer-readable program code portions comprising:

an executable portion that builds an intra-snapshot similarity index, inclusive only of representations of the data inside the initial snapshot;

an executable portion that uses the intra-snapshot similarity index for deduplication of the initial snapshot in a chain of a plurality of snapshots by first using only the representations of the data within the intra-snapshot similarity index of the initial snapshot to perform the deduplication of the initial snapshot prior to using a global similarity index to perform the deduplication; wherein the global similarity index is used to perform the deduplication of the initial snapshot subsequent to using the intra-snapshot similarity index when a deduplication threshold is not met using the intra-snapshot similarity index; and an executable portion that merges the intra-snapshot similarity index with the global similarity index by performing each of:

structurally merging the intra-snapshot index into the global similarity index, bulk inserting entries of the intra-snapshot index into the global similarity index when unable to structurally merge the intra-snapshot index into the global similarity index, and performing the merging of the intra-snapshot index with the global similarity index when deduplication processing of the initial snapshot is complete.

18. The computer program product of claim 17, further including an executable portion that:

for an input similarity unit, searches the intra-snapshot similarity index for similar data, and deduplicates the input similarity unit with found data.

19. The computer program product of claim 17, wherein the intra-snapshot similarity index is built using a resolution that is higher than the resolution of the global similarity index.

20. The computer program product of claim 19, wherein sub-similarity units used to build and to search within the intra-snapshot similarity index are smaller than similarity units used for the global similarity index.

21. The computer program product of claim 20, further including an executable portion that searches high resolution representative values in the intra-snapshot similarity index, and identifies similar sub-units, for matching digests of an input similarity unit and digests of found sub-units to find identical data sections.

22. The computer program product of claim 20, further including an executable portion that calculates a representative value for an input similarity unit based on high resolution representative values of sub-units, the representative value searched in the global similarity index, and a corresponding similarity unit identified for matching digests of the input similarity unit and digests of a found similarity unit to find identical data sections.

23. The computer program product of claim 17, wherein the initial snapshot does not have a preceding snapshot of the same data set.

24. The computer program product of claim 17, wherein the intra-snapshot similarity index resides in memory.

* * * * *